US011373187B1

(12) United States Patent
Cash et al.

(10) Patent No.: US 11,373,187 B1
(45) Date of Patent: Jun. 28, 2022

(54) TOKEN DEVICE FOR DISTRIBUTED LEDGER BASED INTERCHANGE

(71) Applicant: United Services Automobile Association (USAA), San Antonio, TX (US)

(72) Inventors: Duane Cash, McKinney, TX (US); Alexander Nagelberg, San Antonio, TX (US); Hudson R. Jameson, Aubrey, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

(21) Appl. No.: 17/001,239

(22) Filed: Aug. 24, 2020

Related U.S. Application Data

(63) Continuation of application No. 15/592,925, filed on May 11, 2017, now Pat. No. 10,762,506.

(51) Int. Cl.
*G06Q 20/40* (2012.01)
*G06V 40/12* (2022.01)

(52) U.S. Cl.
CPC ... *G06Q 20/40145* (2013.01); *G06V 40/1365* (2022.01)

(58) Field of Classification Search
CPC .............. G06Q 20/40145; G06K 9/00087
USPC ................................................. 705/44
See application file for complete search history.

(56) References Cited

U.S. PATENT DOCUMENTS

| 7,065,579 | B2 * | 6/2006 | Traversal ............... H04L 67/28 709/225 |
| 9,569,771 | B2 | 2/2017 | Lesavich et al. |
| 9,722,790 | B2 | 8/2017 | Ebrahimi |
| 9,774,578 | B1 | 9/2017 | Ateniese et al. |

(Continued)

FOREIGN PATENT DOCUMENTS

| AU | 2016101183 A4 | 9/2016 |
| CN | 105681301 A | 6/2016 |

(Continued)

OTHER PUBLICATIONS ehow.com' [online]. "How Does ACH Work," date unknown, [retrieved on Mar. 6, 2017]. Retrieved from the Internet: URL<http://www.ehow.com/how-does 4911679 ach-work.htrnl>. 7 pages.

(Continued)

*Primary Examiner* — Clifford B Madamba
(74) *Attorney, Agent, or Firm* — Fletcher Yoder, P.C.

(57) ABSTRACT

A portable token device is described, the token device useable to request transactions performed over an interchange system. The token device authenticates a user through the use of biometric data such as a fingerprint. When in proximity to a point of sale (POS) terminal, the token device communicates with the POS terminal over a wireless network to authorize a transaction involving the user. The interchange system employs blockchain elements that can be used in a payment apparatus for managing payments or other types of transactions, and for managing user accounts. The interchange system enables users to enroll in the system, and enables the various users' computing devices to be used as confirmation centers for new transactions and/or funds transfers between users.

19 Claims, 10 Drawing Sheets

(56) References Cited

U.S. PATENT DOCUMENTS

| | | |
|---|---|---|
| 2009/0210328 A1 | 8/2009 | Fomenko et al. |
| 2013/0251214 A1* | 9/2013 | Chung ............... G06K 9/00161 |
| | | 382/116 |
| 2015/0278820 A1 | 10/2015 | Meadows |
| 2015/0332395 A1 | 11/2015 | Walker et al. |
| 2015/0356524 A1 | 12/2015 | Pennanen |
| 2015/0356555 A1* | 12/2015 | Pennanen ............ G06Q 20/389 |
| | | 705/71 |
| 2015/0371224 A1 | 12/2015 | Lingappa |
| 2015/0379510 A1 | 12/2015 | Smith |
| 2016/0203477 A1 | 7/2016 | Yang et al. |
| 2016/0261411 A1* | 9/2016 | Yau ....................... H04L 63/083 |
| 2016/0321751 A1 | 11/2016 | Creighton, IV et al. |
| 2016/0330027 A1 | 11/2016 | Ebrahimi |
| 2016/0358165 A1 | 12/2016 | Maxwell |
| 2016/0365978 A1 | 12/2016 | Ganesan et al. |
| 2017/0046689 A1* | 2/2017 | Lohe ....................... G06Q 20/40 |
| 2017/0053249 A1 | 2/2017 | Tunnell et al. |
| 2017/0061398 A1* | 3/2017 | Joseph ............... G06Q 20/3678 |
| 2017/0076280 A1 | 3/2017 | Castinado et al. |
| 2017/0076286 A1 | 3/2017 | Castinado et al. |
| 2017/0078299 A1 | 3/2017 | Castinado et al. |
| 2017/0103391 A1 | 4/2017 | Wilson, Jr. et al. |
| 2017/0109748 A1 | 4/2017 | Kote |
| 2017/0140375 A1 | 5/2017 | Kunstel |
| 2017/0177898 A1 | 6/2017 | Dillenberger |
| 2017/0206382 A1 | 7/2017 | Rodriguez De Castro et al. |
| 2017/0221052 A1* | 8/2017 | Sheng ................... G06Q 20/065 |
| 2017/0228704 A1 | 8/2017 | Zhou et al. |
| 2017/0230375 A1 | 8/2017 | Kurian |
| 2017/0232300 A1 | 8/2017 | Tran et al. |
| 2017/0236120 A1* | 8/2017 | Herlihy ................ G06Q 20/065 |
| | | 705/67 |
| 2017/0244707 A1 | 8/2017 | Johnsrud et al. |
| 2017/0250972 A1 | 8/2017 | Ronda et al. |
| 2017/0278186 A1 | 9/2017 | Creighton, IV et al. |
| 2017/0279801 A1 | 9/2017 | Andrade |
| 2017/0287068 A1 | 10/2017 | Nugent |
| 2017/0289111 A1 | 10/2017 | Voell et al. |

FOREIGN PATENT DOCUMENTS

| | | |
|---|---|---|
| CN | 106230808 A | 12/2016 |
| CN | 106230852 A | 12/2016 |
| CN | 106408299 A | 2/2017 |
| CN | 106484836 A | 3/2017 |
| CN | 106504091 A | 3/2017 |
| KR | 101590076 B1 | 2/2016 |
| KR | 101591244 B1 | 2/2016 |
| KR | 20160150278 A | 12/2016 |
| KR | 101762245 B1 | 7/2017 |
| KR | 101773073 B1 | 8/2017 |
| KR | 101773074 B1 | 8/2017 |
| KR | 101780636 B1 | 9/2017 |
| WO | 2016036969 A1 | 3/2016 |
| WO | 2017006134 A1 | 1/2017 |
| WO | 2017006135 A1 | 1/2017 |
| WO | 2017006136 A1 | 1/2017 |
| WO | 2017021154 A1 | 2/2017 |
| WO | 2017044554 A1 | 3/2017 |
| WO | 2017066715 A1 | 4/2017 |
| WO | 2017079795 A1 | 5/2017 |
| WO | 2017091530 A1 | 6/2017 |
| WO | 2017104899 A1 | 6/2017 |
| WO | 2017119564 A1 | 7/2017 |
| WO | 2017136956 A1 | 8/2017 |
| WO | 2017139688 A1 | 8/2017 |
| WO | 2017146333 A1 | 8/2017 |

OTHER PUBLICATIONS

Theanswerbank.co.uk' [online]. "What is SWIFT payment," Aug. 13, 2001, [retrieved on Mar. 6, 2017]. Retrieved from the Internet: URL<http://www.theanswerbank.eo.uk/How-it-Works/article/what-is-swift-payment/>. 5 pages.

* cited by examiner

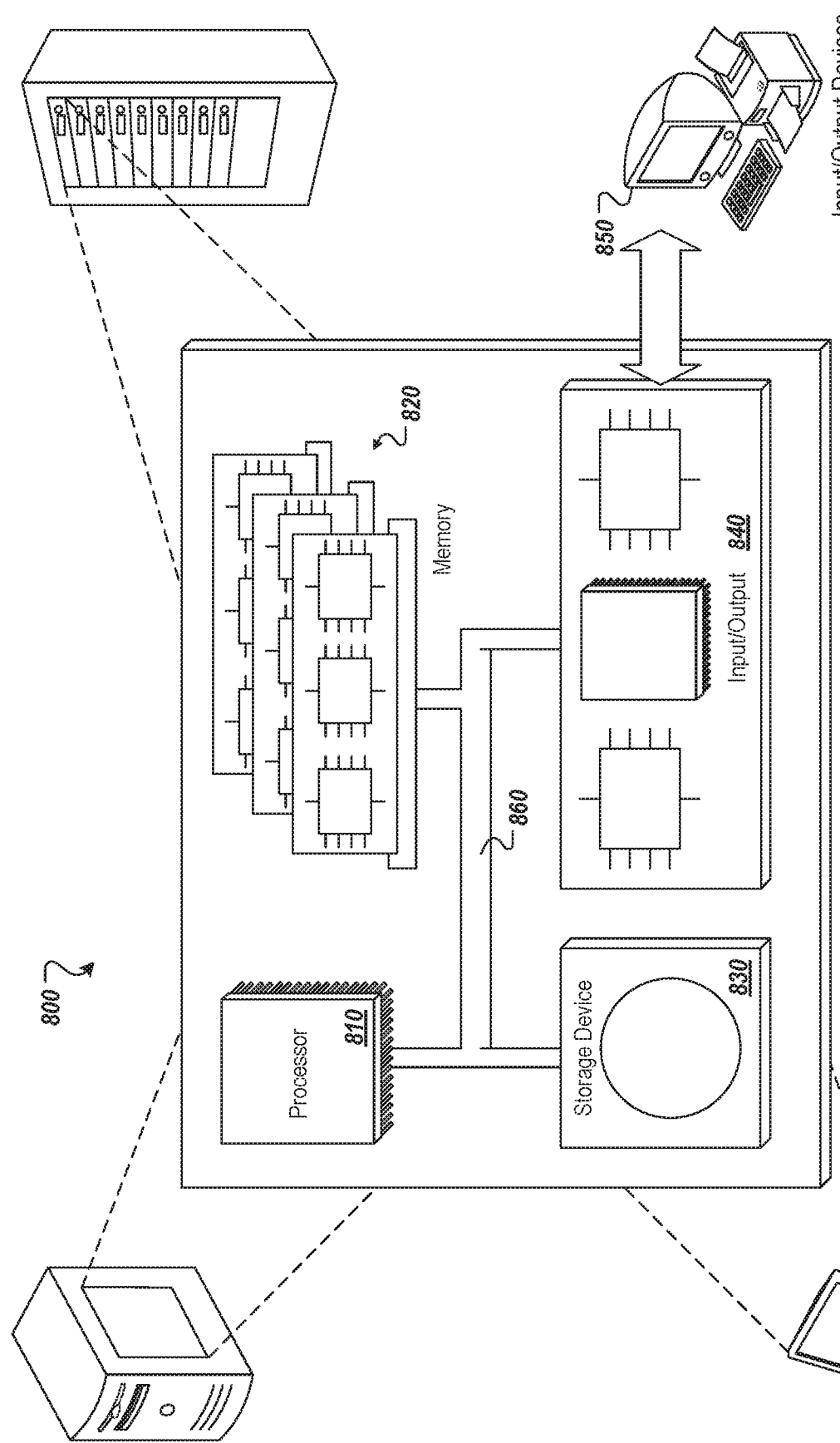

TOKEN DEVICE FOR DISTRIBUTED LEDGER BASED INTERCHANGE

CROSS-REFERENCE TO RELATED APPLICATIONS

This application is a continuation of U.S. patent application Ser. No. 15/592,925, filed May 11, 2017, entitled "Token Device for Distributed Ledger Based Interchange," which will issue as U.S. Pat. No. 10,762,506 on Sep. 1, 2020, and which is incorporated by reference for all purposes.

BACKGROUND

Currently, various systems are in place to perform settlement between financial institutions (e.g., banks) following a purchase or other transaction. Such systems include the Automated Clearing House (ACH) and the Society for Worldwide Interbank Financial Telecommunication (SWIFT) network. For example, a customer may attempt to make a purchase from a merchant. A system may check the customer's bank to see if the customer's specified account holds available funds to cover the transaction. If so, the transaction may be approved. The customer's account may be debited, and a settlement process may later be performed to move the appropriate funds from the customer's bank to the merchant's bank. However, the systems currently in use may not be well suited to a modern, online economy in which transactions are increasing in frequency. In particular, the existing systems may be costly, cumbersome, and overly reliant on third parties. The cost of using existing system may be large due to the transaction fees and the overhead costs paid to third parties to ensure security of payments.

SUMMARY

Implementations of the present disclosure are generally directed to an interchange system for transferring information between entities. More specifically, implementations are directed to an interchange system that employs a blockchain network or other type of distributed ledger to manage transactions between entities, and a token device or other user device for use with the interchange system.

In general, innovative aspects of the subject matter described in this specification can be embodied in methods that include actions of: receiving, on a token device, biometric data generated by a biometric scanner, the biometric data describing at least one physiological characteristic of a user; attempting an authentication of the user based at least partly on the biometric data; and responsive to the authentication of the user being successful, automatically transmitting a signal, using the wireless transceiver, to a terminal that is in proximity to the token device, the signal instructing the terminal to request a transaction involving an account associated with the user.

Implementations can optionally include one or more of the following features: attempting the authentication of the user includes comparing the biometric data to previously collected biometric data for the user, the authentication being successful based on a correspondence between the biometric data and the previously collected biometric data; the previously collected biometric data is stored in the memory of the token device; the biometric scanner is a fingerprint scanner; the biometric data is a scan of a fingerprint of the user; the transaction is performed using a distributed ledger; the token device does not include a display.

Other implementations of any of the above aspects include corresponding systems, apparatus, and computer programs that are configured to perform the actions of the methods, encoded on computer storage devices. The present disclosure also provides a computer-readable storage medium coupled to one or more processors and having instructions stored thereon which, when executed by the one or more processors, cause the one or more processors to perform operations in accordance with implementations of the methods provided herein. The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

Implementations of the present disclosure provide one or more of the following technical advantages and improvements over traditional systems. Because implementations employ a decentralized, distributed ledger (e.g., blockchain) network as the basis of an interchange system, implementations avoid the use of a single, centralized bank for settlement between institutions, such as in the FedWire network that uses the U.S. Federal Reserve System. Accordingly, implementations simplify the settlement process while providing for real time, secure settlement between banks or other institutions. The distributed nature of the system also provides for greater security and reliability than traditional systems, in which a single centralized bank may be a point of failure and/or target for malicious activities. A distributed ledger such as a blockchain also provides for immutability of record storage and transparency into the stored information by the participants in the blockchain network. Accordingly, implementations provide reliable traceability and auditing for any funds that are transferred using the distributed ledger based interchange system.

By providing for an interchange system in which settlement is performed in real time with respect to a transaction, implementations avoid the expenditure of processing capacity, storage, memory, network capacity, and/or other computing resources that traditional systems expend through the use of a batch settlement process. For example, because implementations perform settlement in real time, implementations avoid the use of storage space that would otherwise be used to store the transaction information until a later, batch settlement is performed. Moreover, because implementations provide an interchange system which substantially reduces the likelihood of fraudulent transactions, implementations avoid the expenditure of computing resources that traditional systems may expend to account for fraud and reverse the effects of fraudulent transactions.

It is appreciated that aspects and features in accordance with the present disclosure can include any combination of the aspects and features described herein. That is, aspects and features in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

BRIEF DESCRIPTION OF DRAWINGS

FIG. 8 depicts an example computing system, according to implementations of the present disclosure.

DETAILED DESCRIPTION

Implementations are directed to an interchange system for managing transactions that are requested through use of a portable token device or other type of user device. The interchange system employs blockchain elements that can be used in a payment apparatus for managing payments or other types of transactions, and for managing user accounts. The interchange system enables users to enroll in the system, and enables the various users' computing devices to be used as confirmation centers for new transactions and/or funds transfers between users. The system also provides a payment gateway and/or exchange base between digital currency users and other entities such as merchants, vendors, service-providers, and/or other parties that may use other types of currency (e.g., government-provided currency). In some implementations, the system includes a centralized server and/or cluster of servers that provide blockchain currency miners. User device(s) may also provide blockchain currency miners, in addition to or instead of the server device(s). The currency miners may enable the management of the ledger of transactions and/or transfers of digital currency coins between digital and physical payment apparatuses and/or other financial entities. Miners provide verification by submitting mathematical proofs and are rewarded with transaction fees and/or newly generated crypto-currency (e.g., coins) according to the protocol being employed. Miners record the ledger (e.g., blocks) to the blockchain and, in at least some instances, the network is self-managed.

The interchange system, also described as the system, may enable users to make transfers of confirmed blockchain digital currency coins (also described as coins) in a secure ecosystem, to reduce or eliminate the risk of infiltration by outside networks, and to enable secure digital transactions. In this way, the system allows entities (e.g., companies, financial institutions) to increase their trust product through the use of secure elements in a physical device such as a smartphone, the token device described below, or other suitable type of secure element container that generates transaction messages, sends blockchain requests, and requests the confirmation of digital currency coin transaction logging in the interchange system.

Figure 1:
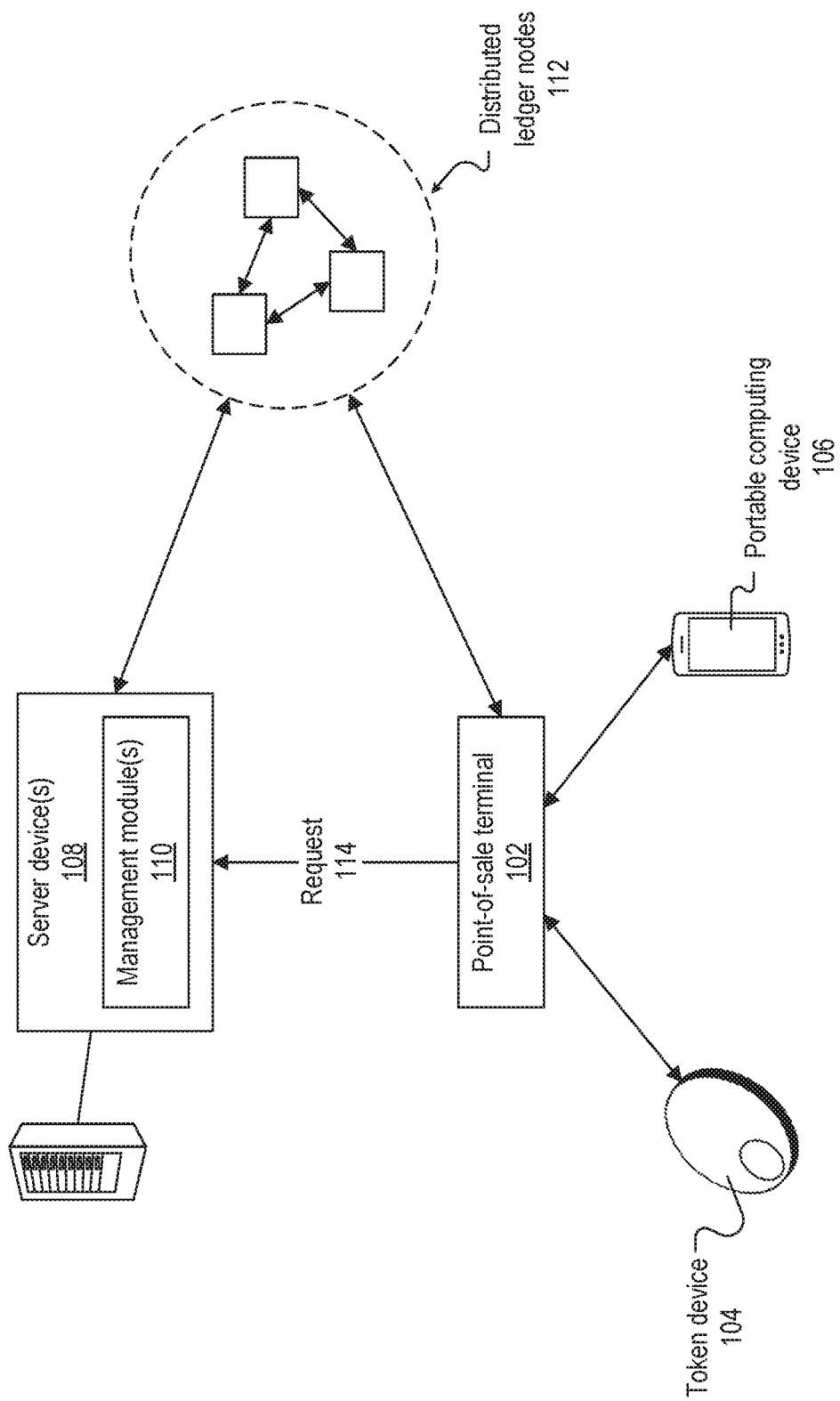
FIG. 1 depicts an example system for a distributed ledger based interchange, according to implementations of the present disclosure.

FIG. 1 depicts an example system for a distributed ledger based interchange, according to implementations of the present disclosure. As shown in the example of FIG. 1, the system may include a point-of-sale (POS) terminal 102. The system may also include a token device 104 and/or a portable computing device 106, one or more server device(s) 108, and distributed ledger nodes 112 on which a distributed ledger (e.g., blockchain) may be present.

The POS terminal 102 may be any suitable type of POS terminal that is configured to receive a request for a payment or other transaction. The POS terminal may be located within a store and/or may be provided by a merchant to receive payments in exchange for goods and/or services. The token device 104 may be a portable device that is particularly configured to interact with a POS terminal 102 and request a transaction (e.g., payment) to be performed in the form of a digital currency (e.g., coins) or other type of currency. The token device 104 is described further with reference to FIG. 2. The portable computing device 106 may include any suitable type of portable computing device, such as a smartphone, tablet computer, wearable computer, implanted computer, and so forth.

The server device(s) 108 may include any suitable type and number of server computing devices, and may execute any number of management modules 110. The token device 104 and the portable computing device 106 may each be described as a user device that is operated by a user. The user may employ the user device, in proximity to the POS terminal 102, to request that a transaction be initiated (e.g., a purchase transaction).

In instances where the user device is a token device 104, the user may interact with a biometric scanner of the token device to activate the device. The biometric scanner may collect biometric data that describes at least one physiological characteristic of the user, such as a fingerprint, retinal scan, image(s) of the user's face or other body parts, audio voice recording data of the user's voice, heartbeat and/or pulse information, neural activity data (e.g., brain wave activity), and so forth. The collected biometric data may be compared to previously collected and stored biometric data of the user, to verify the user's identity. In some implementations, the comparison may be performed on the token device 104, based on biometric data stored in memory of the token device 104. Alternatively, the token device 104 may communicate the biometric data to the server device(s) 108, which may compare the received biometric data to stored biometric data, and determine whether the user is authorized to use the token device 104 to requesting a transaction. The server device(s) may communicate the result of the comparison (e.g., verified or not verified user identity) back to the token device 104. If the user's identity is verified based on the collected biometric data, the token device 104 may transmit a wireless signal to the POS terminal 102 to request and/or authorize a transaction. The signal may be sent using a wireless transceiver in the token device 104. For example, the signal may be configured according to a version of a near field communication (NFC) format, a radio frequency identification (RFID) format, or any other suitable wireless communication format. The comparison of the collected biometric data to the previously collected and stored biometric data (e.g., biometric data that is verified as being of the user) may be performed locally on the token device and/or on a remote server. In some instances, a key or hash may be generated based on the biometric data, and the key or hash may be compared to a previously generated key or hash for the user, to verify the user's identity. The key may also be employed to encrypt data for storage and/or communication over a network.

In instances where the user device is a portable computing device 106 such as a smartphone, the user may interact with an application executing on the device 106 to request the transaction. The user's identity may be verified using biometric data collected through the device 106, as described with respect to the token device 104. Alternatively, the user's identity may be verified based on the user being authenticated to access the device 106 and/or the application running on the device 106. For example, the user may provide credentials for authentication, such as a username, password, personal identification number (PIN), and so forth. Any other suitable method of authentication may also be used, such as an Open Authorization (OAuth) token issued by a trusted authority. The device 106 may communicate wirelessly with the POS terminal 102, using NFC, RFID, and/or other suitable wireless communication protocol.

In some implementations, the POS terminal may indicate an amount that the user is to pay in exchange for goods or services. The user may operate (e.g., wave) the user device in proximity to the POS terminal to authorize the payment be made in the amount shown. The user device, activated in response to successful verification of the user's identity as described above, may transmit a user identifier (ID) to the POS terminal 102, the user ID uniquely identifying the user. The POS terminal 102 may send a request 114 to the server device(s) 108, the request 114 including information regarding the amount, the merchant or other entity to which the amount is to be paid, and the user ID. Management module(s) 110 executing on the server device(s) 108 may confirm the request 114 is valid for the requested amount, by verifying that the user ID corresponds to a registered user who is authorized to send funds using the interchange system. In some instances, the ID could be linked to an address on a blockchain ledger and authentication could be performed by verifying ownership of keys. The module(s) 110 may also confirm that the merchant or other entity associated with the POS terminal 102 is authorized to receive funds using the interchange system.

On verifying that the request is for a valid transaction, the management module(s) 110 may initiate the transaction by communicating with the distributed ledger nodes 112 of a distributed ledger system, e.g., a blockchain system as described below. The transaction may be performed as a transfer of a currency, such as a digital currency, from an account associated with the user to an account associated with the operator (e.g., merchant) of the POS terminal 102. In some implementations, a record of the transaction may be stored on the distributed ledger that is distributed across the nodes 112.

The distributed ledger nodes 112 may include any suitable type and number of computing devices. In some implementations, the nodes 112 may be computing devices that are operated by, or otherwise associated with, institutions that are members of a consortium that exchange funds using the interchange systems, such as banks, credit unions, or other types of financial institutions. The nodes 112 may also be computing devices (e.g., user devices) that are associated with users that are engaged in using the interchange system to make purchases or otherwise request transactions. In some implementations, the nodes may operate miners that are involved in generating blocks for the blockchain system. As described further below, the miners may be distributed across the various nodes for user devices and/or interchange member devices, such that the mining activities are decentralized. In some instances, the mining activities may be performed at least partly by the server device(s) 108. The server device(s) 108 may be operated by, or otherwise associated with, an entity that manages the interchange system.

Figure 2:
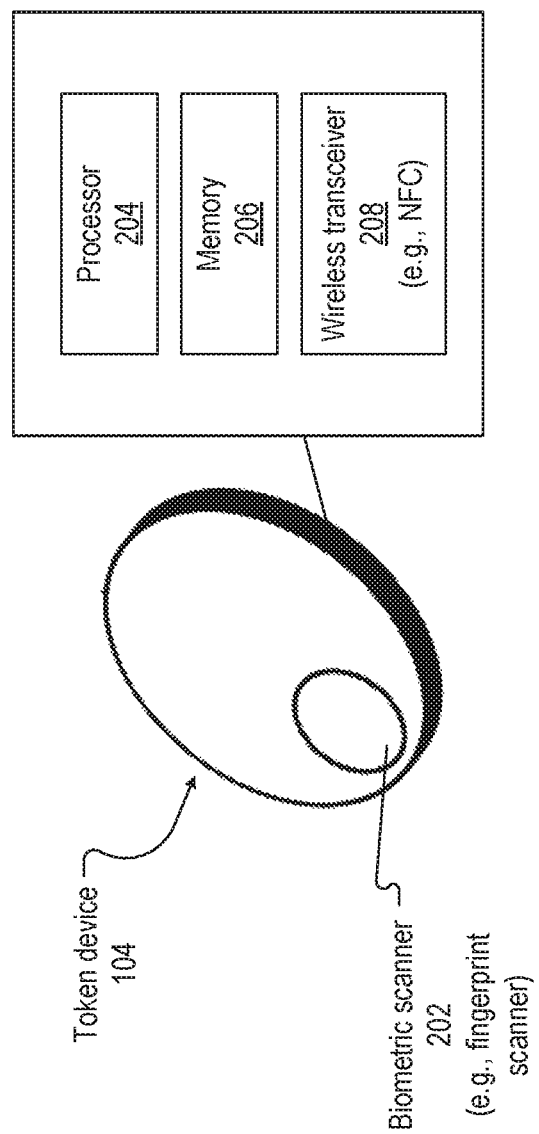
FIG. 2 depicts an example of a token device that may be used with a distributed ledger based interchange, according to implementations of the present disclosure.

FIG. 2 depicts an example of a token device that may be used with a distributed ledger based interchange, according to implementations of the present disclosure. As described above, the token device 104 may include a biometric scanner 202, such as a fingerprint scanner or other component that collects other types of biometric data from the user. The token device 104 may also include a processor 204, a memory 206, and a wireless transceiver 208. In some implementations, the token device 104 is headless, such that it does not include a display.

The processor may execute instructions for software (e.g., firmware) that is stored in the memory 206. The wireless transceiver 208 may be configured to send and/or receive NFC, RFID, and/or other types of wireless signals. Although examples herein describe such signals as wireless radio-frequency signals, implementations are not so limited. The wireless transceiver 208 may also be configured to send and/or receive other types of signals that are used to communicate information to and from the POS terminal 102, such as infrared or optical light signals. The processor 204 may receive the biometric data from the scanner 202 and compare the received data to previously collected biometric data stored on the memory 206. Alternatively, the processor 204 may employ the transceiver 208 to transmit the collected data to the server device(s) for comparison there, as described above. If the biometric data corresponds to the previously collected and stored biometric data for the user, the processor 204 may instruct the transceiver 208 to transmit an authorization signal to the POS terminal 102, indicating that the user has authorized the transaction to be initiated.

Figure 3:
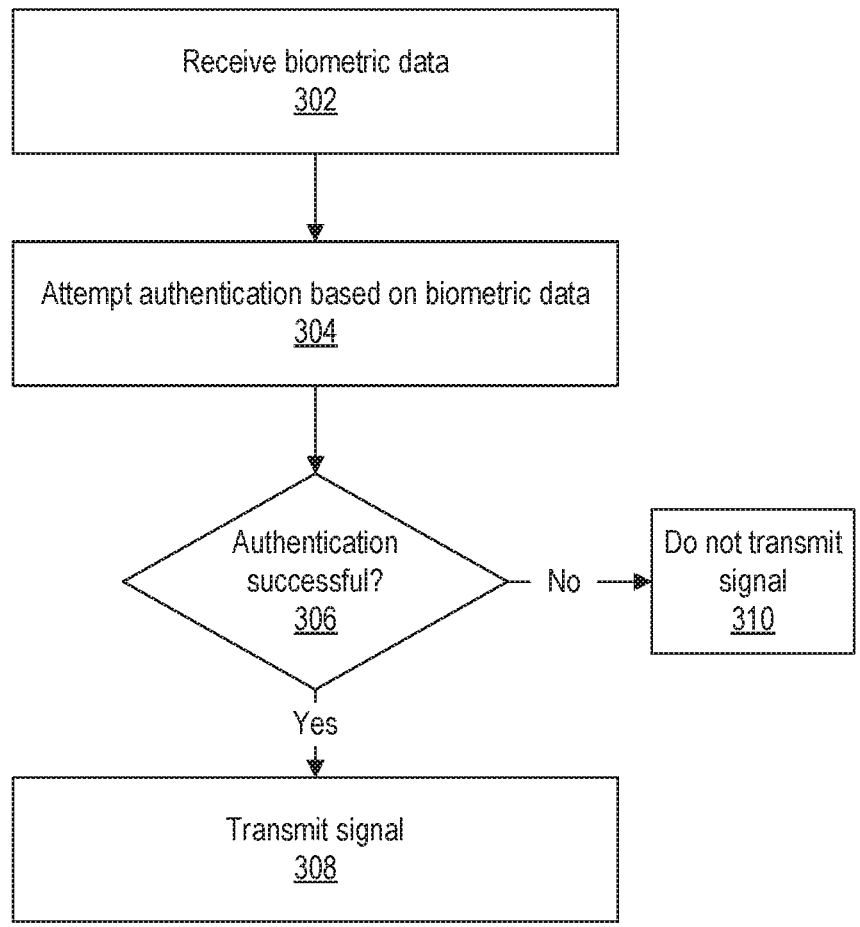
FIG. 3 depicts a flow diagram of an example process for requesting a transaction over a distributed ledger, according to implementations of the present disclosure.

FIG. 3 depicts a flow diagram of an example process for requesting a transaction over a distributed ledger, according to implementations of the present disclosure. Operations of the process may be performed by the processor of the token device 104, or elsewhere.

Biometric data is received (302). As described above, the biometric data may be generated by the biometric scanner of the token device. The biometric data may describe at least one physiological characteristic of the user, such as a fingerprint, retinal scan, voice print data, heartbeat/pulse data, neural activity data, and so forth.

An attempt is made to authenticate the user based at least partly on the biometric data (304). For example, the biometric data collected by the biometric scanner may be compared to previously collected biometric data for the user, and the authentication may be successful based on a correspondence (e.g., match, or sufficient similarity) between the biometric data and the previously collected biometric data. The previously collected biometric data may be stored on the token device, or may be stored on a server. In the latter instance, the comparison may be performed on the server device based on the collected biometric data that is sent from the token device to the server device. The server device may respond to the token device with an indication of whether authentication was successful or not.

If the authentication is successful (306), the signal may be transmitted (308) to the terminal (e.g., POS terminal) using the wireless transceiver of the token device. The signal may be automatically transmitted in response to successful authentication, without requiring any further input from the user. The signal may identify the user of the token device and may provide an indication that the user is requesting a transaction in the amount displayed by the terminal. The token device may be in proximity to the terminal. For example, where the signal is a NFC signal, the token device may be sufficiently close to the terminal to be in range according to the strength of the NFC signal. If the authentication is not successful (306), the signal may not be sent (310). Accordingly, the token device may be configured such that only the authorized user (e.g., the user who initially set up the token device to store their biometric data) may use the token device to authorize a transaction using the user's account.

The server device(s) 108 may also be described as a KeyNET system for transaction authorization. The KeyNET system may log, monitor, and assess communications between the user and the server device(s) 108, either directly from the user device or through the POS terminal 102. The request 114 may be described as a KeyNET that is the delegation unit for blockchain requests and for a transaction ledger stored on the blockchain. The user device (e.g., token device 104 and/or portable computing device 106) operates as a secure payment device for initiating a transaction in coins (e.g., digital currency) or other currency. In some instances, the token device stores a private key that is used to sign a transaction on the blockchain. The POS terminal 102 may be a physical (e.g., stand-alone) payment terminal, or a digital payment terminal (e.g., an application) executing on some other computing device. The POS terminal 102 sends member-confirmation requests to verify the block owner. The KeyNET system serves as an exchange platform for currencies to be translated between currency systems, such as physical (e.g., government-issued) and/or digital currencies. The system may also control the flow of transaction data between the payment elements and the KeyNET servers. Computer algorithms may control the initiation of coin-based payments by creating a coin blockchain package in a suitable data-interchange format, such as a version of JavaScript Object Notation (JSON). The package may be encrypted into individual block hash and transaction data hashes that are added to the transaction blocks in the blockchain. The digital coin blockchain may include any number of individual block elements that are confirmed by miners before being appended to the blockchain. In some implementations, the main blocks in the blockchain are previous hash elements, transaction root data, timestamps, nonce values, a transaction index, Internet Protocol (IP) address chain values, transaction amounts, transaction subjects, transaction types, and transaction messages.

The KeyNET system may use biometric data, OAuth, and/or other token authentication methods to match blockchain requests with user account data. The KeyNET system may also allow users and/or interchange consortium members that have computing devices (e.g., nodes 112) available for peer-blockchain confirmations to verify the ownership of coin units in the blockchain, as a mechanism of rewarding members who opt-in as coin miners. The miners are rewarded as new transactions are created and a blockchain ledger analyzer assigns a digital trust hash to the block as the new block is generated. Successful digital coin mining sends a notification to other miners of the successful event from the KeyNET server, or other node, which stores the coin blockchain. Redundancy and a cross-mining between multiple nodes is used to prevent loss of data on the blockchain. Chains can verify blocks by signing previous ones and re-verifying when new blocks are created.

When a transaction is initiated between entities, the sending party may send a JSON package using over HTTPS (or some other secure channel) to the KeyNET server(s). The JSON package may be configured according to Example Code 1, below.

Example Code 1

```
{
    "memberID": 12345678,
    "transaction": [{
    "block": 23482308,
    "tx_root": 329428,
    "timestamp": 1230983408,
    "nonce": "320E3240392032",
    "prev_hash": "23048AF23423",
    "tx_amount": 0.00224,
    "ip_address": "10.23.100.1",
    "tx_subject": "car payment"
    }],
    "requestTS": "2016-12-03T17:00:0",
    "type": "payments",
    "sessionCookie":              "82348
        SDJLAJAEVF4HIK6Q2O7V",
    "uuid":               "99C234234-E898-43B0-B0E8-
        53308D74A30F"
}
```

In some implementations, a user may request to transfer funds from their account to another account. For example, the user may want to purchase a book at a book store for $45. The member would use their physical coin payment apparatus (e.g., token device and/or portable computing device) to initiate the payment to the book store, through the store's POS terminal. The payment apparatus may be a smartphone that has a pre-enrolled virtual coin as the payment option or the physical token device payment apparatus (e.g., which may be shaped like a coin) that includes an embedded secure blockchain element that is used to make the payment. As described above, the token device may have NFC, Bluetooth Low Energy (BLE), and/or other wireless communication capabilities to enable the initiation of the transaction at a POS terminal or station. The user would see, displayed on the POS terminal, that the item costs $45 USD. The user, with concern for security due to onlookers and/or cameras in the store, may use their token device for payment of the book by waving the token device in (e.g., very close) proximity to the NFC reader or other wireless signal receive of the POS terminal.

The transceiver in the token device may communicate with the POS terminal through (e.g., near-field radio) wireless communication to authenticate the payer and authorize the amount to be paid. In this authentication process, the token device sends a request to the KeyNET server(s) 108 with a transaction payload for the transaction. The KeyNET server(s) receive the encrypted request and de-serialize the payload to read and verify the transaction. The KeyNET server(s) then send a transaction root request to other nodes 112 that are available to verify the blockchain by first sending out a one-way transaction nonce to the nodes 112. The nodes 112 receive the nonce and verify the transaction by matching the transaction root with a series of hash blocks that would verify the block ownership of the transaction initiator. The nodes 112 may send back the hash response to the KeyNET server(s) for confirmation of a successful build of a block. If the block is not successfully built, then the KeyNET server(s) may decline the transaction because there was a flag on the ownership of the block. This may indicate that the transaction was attempted with a false or spoofed token device, or other user device, which could not be verified against the full blockchain. With a successful build of the block, the KeyNET server(s) may send a confirmation to proceed with the transaction using available funds that have been designated by the user. The POS terminal may confirm the transaction by accepting the payment. The KeyNET server(s) may add the new transaction block, using the designated funds, to the full blockchain by updating the hash ledger and making the new full blockchain available in the system. The transaction may now be complete and the member may be able to make another purchase with the new transaction root and blockchain. The chain can be P2P, and the association between a block and an entity is through the submitter (usually a miner), where a block is a ledger of transactions. Accordingly, in some instances, transactions may be verified even based on false claims.

Implementations allow users to engage in peer-to-peer (P2P) and/or user-to-vendor transactions using a secure blockchain payment apparatus (e.g., token device 104) and/or mobile device. Implementations also allow the organization that operates the interchange system to reward users for participation in blockchain owner confirmations and KeyNET ledger analysis through verified mechanisms. This improves the security various products and/or services, provides a currency system that can work across multiple channels, and also provides an interchange system that operates with currency systems used by outside vendors and businesses.

The KeyNET server(s), along with user device-based and/or interchange consortium member-based blockchain currency miners, manage the ledger of transactions and transfers of coins between digital and physical payment apparatuses and other financial entities. Implementations provide a secure payment interchange system, a blockchain-based digital currency of coins, and a mechanism for rewarding users for becoming confirmation centers (e.g., operating nodes 112) for verifying owners of individual block and transaction roots. This aspect transforms user devices and/or other nodes 112 into micro-processing entities (e.g., banks) for the interchange system as a part of a platform for a processing payments, and thereby reducing the need for costly transaction fees that are accrued with traditional credit card transactions.

Implementations provide for a private and secure coin blockchain as a distributed ledger system. The distributed ledger system may support closed enrollment, to provide a ledger that is only accessible to authorized entities (e.g., members of the interchange system consortium). Implementations may support both centralized and decentralized components for mining. For example, mining may be performed in a decentralized manner, using the user devices of users wishing to transact using the interchange system. Mining may also be performed in a decentralized manner, using computing devices of entities (e.g., banks) that are authorized entities on the interchange system (e.g., consortium members). In some implementations, mining activities may initially be performed (e.g., in a centralized manner) on the server device(s) 108. Later, the mining activities may be at least partly distributed for decentralized mining on the user device(s) and/or computing devices of consortium members.

A user may employ the system to request transfers such as P2P transfers to other individuals and/or purchase transactions. The user may also employ the system for paying bills and/or other types of transactions. Implementations may provide a front end that the user may employ to initiate a transaction. The front end may be an application executing on the device 106, and/or may be embodied in the hardware and software components of the token device 104. The front end may also be provided as a web interface or other user interface, through a web site or other online portal. The user may log into the front end, or otherwise authenticate themselves, and request a transaction. The front end may generate (e.g., JSON) the request 114 describing the transaction to be performed. The request 114 may be communicated to the server device(s) 108 using HTTPS or some other suitable secure communication protocol. As described above, if the module(s) 110 approve the transaction, the nodes 112 may be instructed to perform the transaction by adding blocks to the distributed ledger.

In some implementations, pre-verification operations may be performed by the module(s) 110 prior to receiving the request 114, to enable faster response to a received request 114. Pre-verification may employ a constructed data structure, such as one or more indexes, that provide a mapping between a particular transaction ID and all the records associated with that ID. This data structure provides a digest or an index of all the blocks related to a particular ID, which may be distributed across the various nodes that store information for the distributed ledger. The data structure may be employed to keep track of a user balance, and enable a quick check to be performed to ensure that funds are available if the user is requesting a transaction. If the available funds are not less than the amount of the transaction described in the request 114, the transaction may be approved. Otherwise, the transaction may be denied. In some implementations, the current balance may be based on all the previously verified transactions for the user, as indicated on the blockchain. Currently pending (e.g., not yet verified) transactions may not be reflected in the current balance.

After verifying adequate current balance and an authorized requesting user, and confirming that both the sender and recipient in the transaction have accounts accessible through the interchange system, the transaction may be approved and the funds may be transferred. The interchange system may be used to reconcile payments to and from users who are registered to use the interchange system for transfers, and also to reconcile payments from a registered user to an unregistered user.

Implementations of a distributed ledger based interchange system for transferring funds and/or other types of value between entities. Various institutions, such as financial institutions (e.g., banks, credit unions, investment management firms, etc.) may opt into and participate in the distributed ledger based interchange system (e.g., be members of the consortium participating in the interchange system). A decentralized and distributed ledger system, such as a blockchain network, may include treasury accounts, and each treasury account may be associated with an institution that participates in the distributed ledger based interchange system. A treasury account may also be described as an institutional account. Each institution may provide funds to be deposited into the associated treasury account. On detecting a requested transfer from one entity's institutional account (e.g., bank account) to another, the system may confirm that each account exists in its respective institution, and the sending account may be checked to ensure that it includes sufficient funds for the transfer.

If each of the sending institution and the receiving institution is present on the distributed ledger system (e.g., if each has a treasury account in the distributed ledger system) the transaction may be submitted for approval based on the votes of the peers in the distributed ledger system. If at least a threshold number of votes are to approve the transaction, the transaction is approved. A signal may be sent to the institutional systems indicating that account of the sending entity may be debited the value of the transaction, and the account of the receiving entity may be credited the value of the transaction. Settlement may occur between the treasury accounts of the sending and receiving institutions, the treasury accounts present on the distributed ledger system. In the settlement, value may be transferred from the treasury account of the sending institution to the treasury account of the receiving institution. The settlement may be performed in real time with respect to receiving the request for the transaction, with respect to crediting and debiting the receiving and sending entities accounts on the institutions, and/or with respect to the peer voting. In some instances, the settlement is in real time accounting for the time needed for the peer voting. In some implementations, settlement may occur later as an aggregate settlement between the two institutions involved in the transaction, e.g., at the end of the day.

In some implementations, each of the institutions participating in the distributed ledger based interchange system may maintain an amount of funds in their respective treasury account. A number of digital currency coins may be allocated to an institution, such that a value of the allocated coins corresponds to the funds in their treasury account. Settlement may include the transfer of the appropriate number of coins from the sending institution's treasury account to the receiving institution's treasury account. In some implementations, the coins may be assigned a fixed value with respect to another (e.g., non-digital) currency, such as United States Dollars (USDs), Euros, and so forth.

Figure 4:
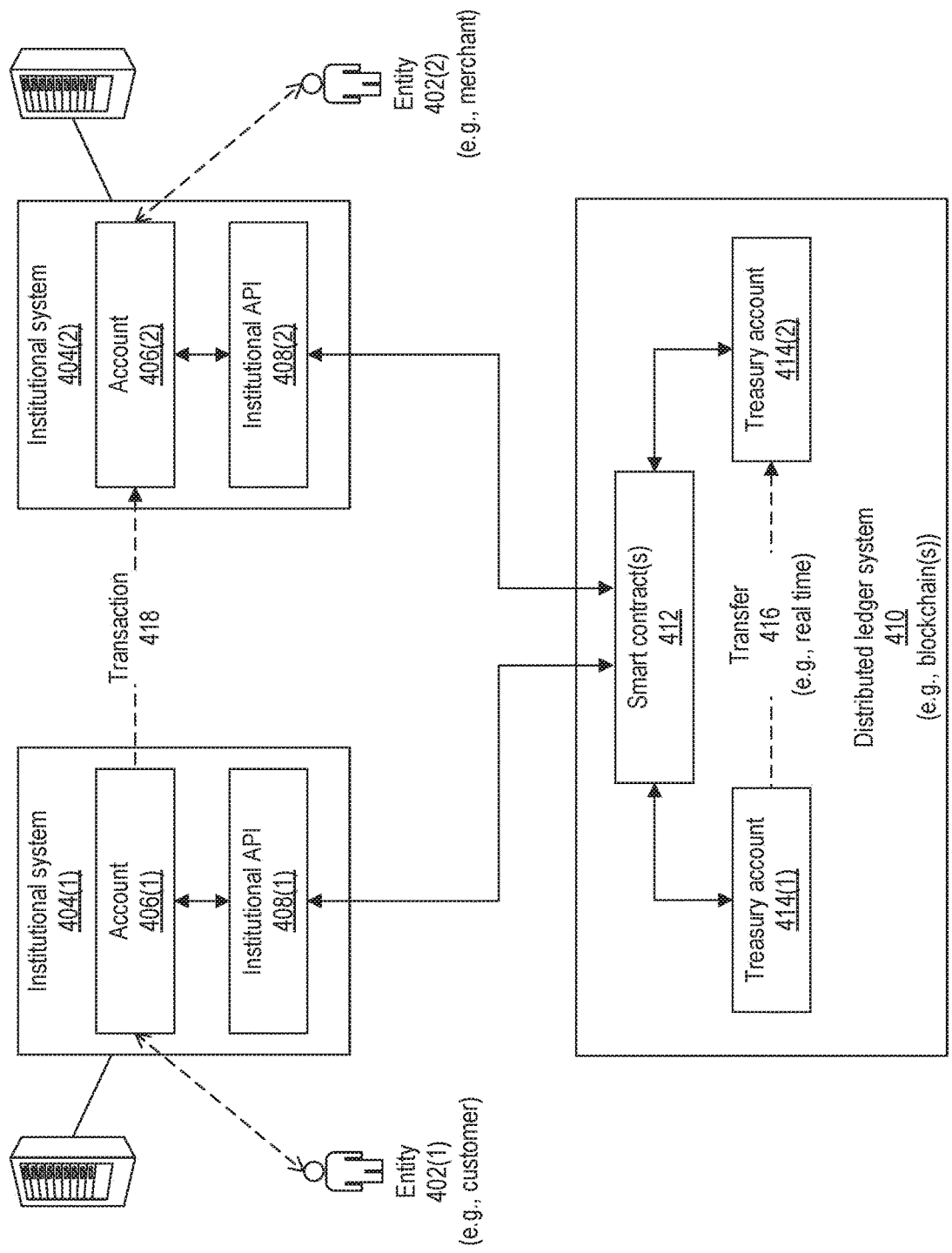
FIG. 4 depicts an example system for a distributed ledger based interchange, according to implementations of the present disclosure.

FIG. 4 depicts an example system for a distributed ledger based interchange, according to implementations of the present disclosure. As shown in the example of FIG. 4, an entity 402(1) may have an account 406(1) with an institution such as a bank, credit union, and so forth. An entity 402(2) may have an account 406(2) with another institution or the same institution as entity 402(1). Each institution may operate an institutional system 404. The institutional system may include any appropriate number of type of computing device, such as server computer(s). The account 406(1) may be maintained on an institutional system 404(1) for a first institution, and the account 406(2) may be maintained on an institutional system 404(2) for a second institution. In some instances, the systems 404(1) and/or 404(2) may be node(s) 112 involved in blockchain mining activities as described above.

In some implementations, an institutional system 404 may export or otherwise provide an interface, such as an institutional application programming interface (API) 408. The interface 408 of an institutional system 404 may be accessed by an external process to request account information, funds transfers, deposits, payments, and/or other changes to an account 406 that is maintained on the institutional system 404. The interface 408 may be programmatic interface, including one or more exposed methods that may be called. In some instances, the interface may include one or more user interfaces (UIs) such as web interfaces or other types of graphical user interfaces (GUIs). A user may access the interface(s) to view account information, request funds transfers, pay bills, change personal information (e.g., address information), and so forth. The interface(s) may also be accessed by automatic external processes to perform such operations through a GUI. Access to an account 406 through an interface 408 may require the appropriate credentials associated with the entity 402, such as username, password, login, personal identification number (PIN), biometric identification information (e.g., fingerprint, voice print, retinal scan, etc.), and so forth.

Each of the institutions may participate in a distributed ledger based interchange system that is used to perform settlement operations for various transactions and/or transfers between entities. To participate in the distributed ledger based interchange system, an institution may have a treasury account 414 on a distributed ledger system 410. The distributed ledger system 410 may be a decentralized ledger system that includes any suitable number of nodes that are not all in a same location. In some implementations, the distributed ledger system 410 is one or more blockchains. Accordingly, the distributed ledger system 410 may also be described as a blockchain network. The distributed ledger system 410 may also include one or more smart contracts 412. A smart contract may include executable code that is configured to access the treasury accounts on the distributed ledger system, as well as the various external systems (e.g., institutional systems 404) of the institutions participating in the distributed ledger based interchange system. The smart contract(s) 412 may be on the distributed ledger system 410 or may be external to the distributed ledger system 410.

A blockchain is an immutable public ledger of all transactions that have ever been executed in one or more contexts (e.g., negotiable instrument transactions, digital currency transactions, funds transfers, etc.). A blockchain grows as completed blocks are added with a new set of transactions. In some examples, a single block is provided from multiple transactions. In general, blocks are added to the blockchain in a linear, chronological order by one or more computing devices in a peer-to-peer network of interconnected computing devices that execute a blockchain protocol. In short, the peer-to-peer network can be described as a plurality of interconnected nodes, each node being a computing device that uses a client to validate and relay transactions (e.g., deposits of checks). Each node maintains a copy of the blockchain, which is automatically downloaded to the node upon joining the peer-to-peer network. The blockchain protocol provides a secure and reliable method of updating the blockchain, copies of which are distributed across the peer-to-peer network, without use of a central authority.

Because all users (e.g., financial institutions) need to know all previous transactions (e.g., deposits, withdrawals, etc.) to validate a requested transaction, all users must agree on which transactions have actually occurred, and in which order. For example, if two users observe different transaction histories, they may be unable to come to the same conclusion regarding the validity of a transaction. The blockchain enables all users to come to an agreement as to transactions that have already occurred, and in which order. In short, and as described in further detail below, a ledger of transactions is agreed to, based on the amount of work required to add a block to the blockchain. Each transaction on the ledger corresponds to a block. In this context, the work is a task that is difficult for any single node (e.g., computing device) in the peer-to-peer network to quickly complete, but is relatively easy for a node (e.g., computing device) to verify.

The peer-to-peer network includes so-called miners (e.g., computing devices) that add blocks to a blockchain based on a blockchain protocol. In general, multiple miners validate transactions that are to be added to a block, and compete (e.g., perform work, as introduced above) to have their block added to the blockchain. Validation of transactions includes verifying digital signatures associated with respective transactions. For a block to be added to the blockchain, a miner must demonstrate a proof of work before their proposed block of transactions is accepted by the peer-to-peer network, and is added to the blockchain. A blockchain protocol includes a proof of work scheme that is based on a cryptographic hash function (CHF). An example CHF includes the secure hash algorithm 256 (SHA-256). In general, the CHF receives information as input, and provides a hash value as output, the hash value being of a predetermined length. For example, SHA-256 outputs a 256-bit (32-byte, 64-character) hash value. In some examples, the hash value is a one-way hash value, in that the hash value cannot be 'un-hashed' to determine what the input was. The blockchain protocol can require multiple pieces of information as input to the CHF. For example, the input to the CHF can include a reference to the previous (most recent) block in the blockchain, details of the transaction(s) that are to be included in the to be created block, and a nonce value (e.g., a random number used only once).

As introduced above, multiple nodes compete to hash a set of transactions and provide the next block that is to be added to the blockchain. This blockchain protocol provides a threshold hash to qualify a block to be added to the blockchain. For example, the threshold hash can include a predefined number of zeros (0's) that the hash value must have at the beginning (e.g., at least the first four characters of the hash value must each be zero). The higher the number of zeros, the more time-consuming it is to arrive at a qualifying hash value.

In accordance with the blockchain protocol, each miner in the peer-to-peer network receives transaction information for one or more transactions that are to be included in a block that is to be added next in the blockchain. Each miner provides the reference to the previous (most recent) block in the blockchain, details of the transaction(s) that are to be included in the to-be-created block, and the nonce value to the CHF to provide a hash value. If the hash value does not meet the threshold hash (e.g., the first four characters of the hash value are not each zero), the miner starts again to provide another hash value. If the hash value meets the threshold hash (e.g., at least the first four characters of the hash value are each zero), the respective miner successfully created the next block that is to be added to the blockchain. Consequently, the respective miner's block is broadcast across the peer-to-peer network. All other miners cease work (because one miner was already successful), and all copies of the blockchain are updated across the peer-to-peer network to append the block to the blockchain. In some instances, the other participants in the network may be required to first verify that the block hash is indeed less than the target (also referred to as the hash difficulty). Each miner may be required to produce hundreds or thousands of hash values, before any one miner provides a qualifying hash value (e.g., at least the first four characters of the hash value are each zero). In some implementations, the variable Proof of Work difficulty may require a hash with the same number of leading zeros as the target. In some implementations, the variable Proof of Work difficulty may require a hash that is less than the target difficulty. For example, if the difficulty target is 0x000051111 but the hash found was 0x000091111, the hash would not satisfy the proof even though both have the same number of leading zeros. In such examples, the network miners would need to continue mining blocks.

In some cases, the distributed ledger system can include one or more sidechains. A sidechain can be described as a blockchain that validates data from other blockchains. In some examples, a sidechain enables ledger assets (e.g., a digital currency) to be transferred between multiple blockchains.

A smart contract may include any suitable software-based protocol that (e.g., automatically) facilitates, verifies, and/or enforces the negotiation of a contract and/or performance of aspect(s) of a contract. The smart contract(s) 412 may receive an indication of a transaction 418 that has been requested between an entity 402(1) and an entity 402(2), such as a customer purchase from a merchant using a credit card or other payment method. The smart contract(s) 412 may submit the transaction for voting by the peers in the distributed ledger system 410. If at least a threshold number of peers vote to approve the transaction, the institutions may be informed (e.g., through the APIs 408) that the transaction has been approved, and the appropriate accounts 406 may be debited and credit respectively with the amount of the transaction. The smart contract(s) 412 may also access the treasury accounts 414(1) and 414(2) of the sending and receiving institutions, and perform the settlement for the transaction by performing a transfer 416 of the appropriate value between the treasury accounts 414.

In some implementations, the smart contract(s) 412 may automatically perform operations to solicit and check the votes of peers in the distributed ledger system, determine whether a transaction is approved or disapproved based on the voting, perform settlement operations to transfer value between treasury accounts, interface with the institutional systems to instruct the institutional system to debit and credit the appropriate accounts 406 according to an approved transaction, and/or perform other operations. The smart contract(s) 412 may also store record(s) on the distributed ledger system 410 describing the various transfers made between treasury accounts. Because of the immutable nature of information stored on the distributed ledger system 410, such records may provide a reliable audit trail of transactions settled using the distributed ledger based interchange system.

In some implementations, the settlement between treasury accounts may be performed in real time with respect to the transaction 418. A real time settlement may include the automatic performing of one or more operations without requiring human input and without any intentional delay, taking into account the processing limitations of the computing system(s) performing the operations and the time needed to perform the operations. Thus, the settlement may be performed in real time with respect to receiving an indication of the transaction 418 to be performed, accounting for the amount of time needed to approve the transaction based on the peer voting in the distributed ledger system 410. Alternatively, settlement may be an aggregate (e.g., batch) process that is performed periodically, such as daily, to settle between treasury accounts based on the various multiple transactions that have been performed between the two corresponding institutions during the time period.

The distributed ledger based interchange system described herein provides solution to the problems financial institutions face using traditional payment systems, such as the Automated Clearing House (ACH) system. Implementations provide an institution-to-institution (e.g., bank-to-bank) payment network that provides fast, real time settlement, real time and automatic reconciliation, and various anti-fraud measures through the immutable record-keeping on the distributed ledger, as described further below. Implementations may employ blockchain technology, in some instances in conjunction with smart contract technology. In some implementations, a highly customizable participatory blockchain architecture is provided that allows for permissioned access to use the system, control over who views the financial transactions, and/or network redundancy. The advantages of the distributed ledger based interchange system for financial transactions include: low transaction costs tamper resistance, transparency, and fraud prevention provided by the decentralization of the distributed ledger across the various institutions that are participating in the interchange system; the real time (e.g., nearly instant) settlement of funds between institutions; and the fast and reliable reconciliation between financial institution. In some implementations, the cost and/or fee per transaction may be considerable lower than in traditional systems, e.g., on the order of 0.00000002 ETH (units for the Ethereum cryptocurrency), which is too small to practically convert into USD. The cost and/or fee may be based on the network volume compared to the number of participants. The cost and/or fee may also change as the number of nodes on the network changes, and therefore the number of transactions present in the unconfirmed transaction pool varies.

Implementations may employ blockchain(s) and or other types of distributed ledger system(s) to provide for fast, real time settlement while limiting costs and providing security for the processed transactions. In some implementations, blockchain(s) are used in conjunction with smart contract(s) in the distributed ledger system. Blockchain(s) may act as a permanent, immutable ledger systems that can store, retrieve, and verify data. A blockchain may provide an authenticated database which automatically processes, broadcasts, and validates data-driven transactions while also preventing the incorporation of unauthorized transactions. Accordingly, a blockchain may operate as a distributed data store such that there is no single master node within the blockchain network and such that every node on the blockchain network is an equal peer for voting purposes. A consensus system may be used to make decisions regarding which transactions are valid and therefore should be added to the ledger at pre-set intervals of time. In some implementations, a transaction may be added to the ledger within a pre-determined time period following the transaction (e.g., following the initiation of the transaction). These aspects may be dependent on the specific implementation of the underlying blockchain. For example, the Bitcoin blockchain is so saturated that unless a reasonable transaction fee is provided, a transaction may pend unconfirmed for a significant period of time. This is less of an issue with the Ethereum blockchain due to the transaction volume vs. number of participants ratio, and also due to the average Ethereum block time which is much lower than that of Bitcoin. Implementations may employ a private blockchain, e.g., staked to the Ethereum chain, to ensure that there is sufficient available computing power to handle any appropriate number of transactions.

In short, only when a consensus system decides a transaction is valid (which may take some time, due to the proof of work algorithm required), and the transaction fee is reasonable compared to other transactions on the network (if the consortium network between banks opts to use a transaction fee at all), then the transaction may be added to a block, and that block to the ledger.

The use of blockchain(s) may provide many benefits compared to traditional, centralized databases. For example, the immutability and transparency of a blockchain network prevents fraud and renders the transactions logged in the network unalterable (e.g., un-hackable) once consensus is reached among the peers. Smart contracts are modular, repeatable, autonomous scripts which may execute on a blockchain, and which can be used to build distributed applications. Smart contracts can be coded to reflect any kind of (e.g., business or engineering) logic which is data-driven. For example, smart contracts may perform actions of any degree of complexity, such as up-voting a post on a forum, loan collateralization, managing futures contracts, repayment prioritization on a structured note, and so forth. Relationships and/or obligations that are coded into a smart contract may benefit from blockchain security logic as well as an increase in verifiability.

By writing and executing smart contracts on a participatory blockchain network, implementations provide a highly redundant, secure system to facilitate interchange between institutions. Implementations may provide other features including: a permissioned, consortium blockchain between trusted institutions; automated, real time (e.g., close to instant) settlement between institutions; automated reconciliation between institutions; low transaction fees; a readily scalable architecture; semi-private data that can be veritably tied back to the institutions transacting on the network for the purpose of audits; and/or future proofing the system with the ability to expand functionality as blockchain technology advances.

The distributed ledger based interchange system, according to implementations described herein, provides various advantages over traditional interchange systems such as ACH. Such advantages include those listed below.

Implementations provide for the real time processing of the transaction and settlement, compared to ACH which may take one to three days for settlement.

Implementations provide an interchange system that is controlled by no one particular party and that is instead managed by a decentralized consortium of institutions, compared to ACH which uses the United States Federal Reserve and/or one of the three private sector ACH operators who make up the Private Sector Exchange (PAX).

Implementations provide a ledger that is transparent and semi-private (see below) to detect fraud, compared to ACH which is non-transparent in its transaction records. Implementations may provide for the real time handling of transactions, compared to the batch processing, store-and-forward system employed by ACH in which transactions received by the financial institution during the day are stored and processed later in a batch mode.

Implementations provide an interchange system that may be operated with lower fees (e.g., under $0.05 per transaction, under $0.10 per transaction, etc.) compared to ACH, which may charge a fee per transaction ranging from $0.15 to $0.95 (currency examples in USD). In some instances, a per transaction fee may be higher, and additional cost savings may be achieved through reducing the incidence of fraud.

Implementations may also provide for fewer parties involved in each transaction compared to ACH. For example, two participants (e.g., the two institutions) may be parties to the transaction handled by the distributed ledger based interchange system. If there is a need for a trustless exchange of funds to occur, a third party arbiter may become involved as well. ACH transactions typically involve five participants: the originating company or individual (Originator), the Originating Depository Financial Institution (ODFI); the ACH Operator; the Receiving Depository Financial Institution (RDFI); and the receiving company, employee or customer (Receiver). By operating with fewer involved parties, implementations may provide an interchange system that is exposed to fewer points of failure, less exposure to fraud, fewer points of delay, and/or other advantages compared to ACH.

Implementations provide an interchange system that is backed by trust in, and/or reliance on, the cryptography of the distributed ledger system and the smart contracts operating properly. Accordingly, implementations may operate more reliably and with greater transparency and trust compared to ACH, which may be backed by trust in the centralized institution and the third parties that facilitate the transactions.

Implementations are effectively tamper proof through the use of the blockchain technology and the consensus mechanism used, because a transaction written to the blockchain cannot be altered after it has been written. In some instances, traditional systems may be vulnerable to tampering given their control by a centralized party.

In some implementations, digital currency coins may be employed to track value within the distributed ledger based interchange system. Coins may be distributed within the system through a multi-signature coin generation process, which may also be described as minting. Multiple parties who are participating in the network may sign a transaction requesting a particular number and/or value of coins to be sent to one or more parties who are participating in the transaction signing. Through the coin minting process, the system may maintain a fixed exchange rate between the coins and other (e.g., non-digital currencies) such as national currencies (e.g., USDs, Euros, Chinese Renmimbi/Yuan, etc.). For example, if a participating institution indicates that it needs 20,000 coins to cover expected transactions processed through the interchange, the institution may be required to prove that is has the equivalent amount of funds (e.g., USD) to maintain the pegged value of the coins (e.g., $1 per coin). In this example, the institution may deposit $20,000 into its treasury bank. Through the transparency of the distributed ledger (e.g., blockchain network), various participants in the interchange system may verify with one another that there is $20,000 from the institution protected in a treasury bank.

In some implementations, each participant may have a public key to represent themselves within the interchange system, and a private key to verify their identity and/or the transactions associated with their public key. A transaction may be crafted and signed with the private keys of all the participating institutions, e.g., to indicate that the particular institution can be distributed 20,000 coins, because the participating institutions have verified both individually and as a collective that the particular institution has $20,000 stored in a treasury bank. In some implementations, as in the example above, signatures of all participating institutions may be required to verify coin distribution to a particular institution. For example, a 6-of-6 multi-signature scheme may be used if there are six participants in the interchange system. Alternatively, the smart contract may be configured to release coins based on any condition and/or combination of conditions, including having a majority of participants sign the transaction to release the coins as opposed to every network participant needing to sign (e.g., approve) the transaction. In some implementations, to prevent fraud a certain percentage of signees may be required to not be the holder of any distributed coins, and such signees may act only as an audit party to verify that the transaction is not fraudulent. In some instances, the audit party may be held at least partly liable if fraud occurs with the parties receiving the coins, because the audit party failed to provide due diligence before signing the transaction.

The overall coin supply, e.g., the number of coins currently available in the given ecosystem, may be separate from the individual members' treasury accounts, and each member's individual holdings in digital coins may be directly related to the amount of fiat (e.g., national) currency which they hold in assets and which is available for transfer. The coins can be used as a trustless, verifiable record of the current state of transactions after individual transfers happen, and the coins may be so used any time the system is used. Because the currently accepted way of transferring fiat currency between banks in the U.S. is either through a wire or through the U.S. Federal Reserve system, implementations may still use a periodic (e.g., nightly, weekly, etc.) batch settlement for banks who choose to keep their holdings entirely in fiat currency.

Once settlement is performed, the coins held in the banks' cryptocurrency stores (e.g., digital "wallets") can be reconciled with the amount of fiat assets held in their treasury accounts. In this way, coins may be effectively controlled by each member's wallet, which may be associated with a randomly generated address and/or a private key to prove ownership of the wallet. When a transaction happens on the blockchain, the blockchain itself may serve as the immutable record of how much a member has in their wallet. This transparency may also allow banks to prove that they stay in regulatory (e.g., FDIC) compliance for cash on hand. For example, a member may be required to have at least 10% of their savings accounts aggregate balances available on hand. Other disincentives may also be used to discourage cheating.

Figure 7:
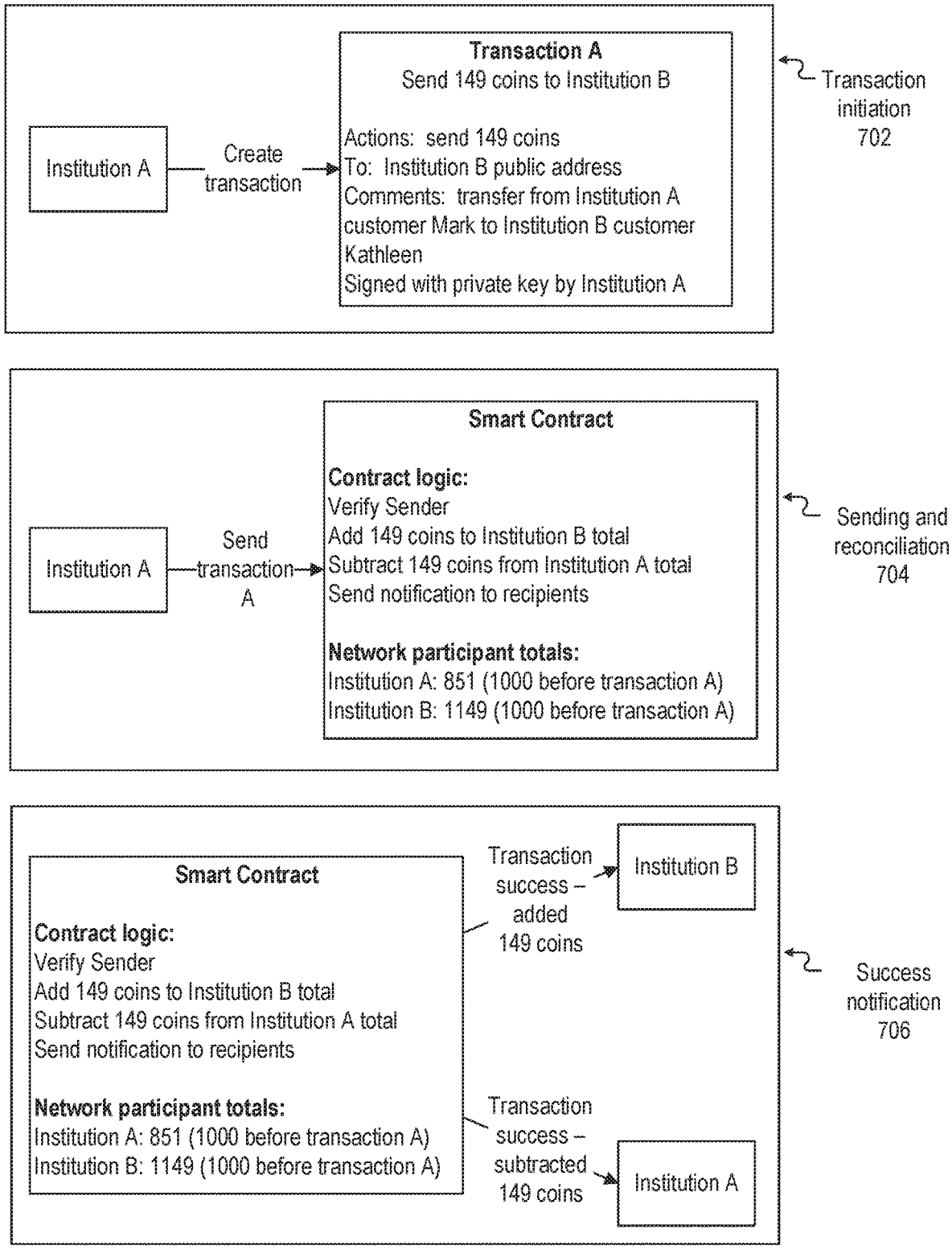
FIG. 7 depicts an example transfer of digital currency coins within the distributed ledger based interchange, according to implementations of the present disclosure.

FIG. 7 depicts an example transfer of digital currency coins within the distributed ledger based interchange, according to implementations of the present disclosure. In the example shown, Mark (a customer of Institution A) wants to transfer $149 to Kathleen (a customer of Institution B). Because Institutions A and B are both participants in the interchange system described herein, they may wish to facilitate this transfer using the interchange system to avoid fees, and to achieve the other advantages described above. During the transaction initiation phase 702, Institution A creates Transaction A to indicate that 149 coins are to be deposited into the coin supply for Institution B within the distributed ledger system 410. Transaction A may be signed by Institution A using its private key. The coin supply may be related to the treasury accounts, and may be used in instances where real-time funds transfers between banks cannot be facilitated by the system and is performed by an external system in a batch process. In such instances, the coins can be used to indicate the current state of who owes who and how much is owed.

During the sending and reconciliation phase 704, Institution A may send Transaction A to the smart contract(s) 412. In response to receiving Transaction A, a smart contract can alter the coin supply totals of the network participants as indicated in the transaction. In some implementations, the coin supply totals may be held within the smart contract storage and can be modified through trade and/or authorized transactions by network participants according to the rules of the network. According to the logic of the smart contract, 149 coins are added to Institution B's total coin supply and 149 are subtracted from Institution B's total coin supply. In some implementations, the 6-of-6 multi-signature example described elsewhere may be codified in the smart contract(s). In some implementations, the smart contract operates as an automated, trustless arbiter that verifies the terms of the contract (e.g., agreed upon by the parties before the smart contract is implemented).

During a success notification phase 706, messages are sent from the smart contract (e.g., over network(s)) to Institutions A and B, indicating that a successful transaction has occurred. In some implementations, the process from the initial trade to clearing and settlement may be completed in under 30 seconds. FIG. 4 provides an example use case. In some instances, more steps can be programmed into the smart contract to perform additional operations. For example, the smart contract may perform an intermediate step in which Institution A communicates with Institution B through the smart contract to verify that a customer of Institution B (e.g., Kathleen) exists before sending the transaction. If a customer of Institution A attempted to send money to a non-existent customer, Institution B could choose to reject the transaction. Moreover, implementations may provide a format for the transaction messaging format used to communicate with the smart contract, the format including information such as International Bank Account Numbers (IBANs), routing numbers, account numbers, and so forth.

The process of transferring coins according to their value in some other currency (e.g., USD) may be facilitated via smart contract connections to the treasury banks of the participating institutions. For example, Bank XYZ may have 20,000 coins in the interchange system and may want to trade their coins for the equivalent value in another currency (e.g., 20,000 USD). XYZ may send a transaction to the smart contract requesting a transfer of 20,000 coins to 20,000 USD. The smart contract may contact a treasury bank that is connected to the interchange network and broadcast the request. Implementations may employ various ways to send this request. In some instances, XYZ may specify which treasury bank it wants to transact with, especially if the USD amount it wants to withdraw is less than or equal to what it initially deposited to participate in the network. The smart contract may broadcast the transaction request from XYZ to the other participating treasury banks who may then bid on accepting the transaction. In some implementations, a transaction fee in either coins or USD could be specified to create an incentive for treasury banks to facilitate the transaction request. Once a treasury bank is selected by either XYZ or the smart contract, the treasury bank would process a wire transfer, ACH transaction, or some other type of transfer. The treasury bank would publish proof of the transfer on the blockchain, such as an image of the transaction, a transaction confirmation number, or other proof.

Implementations support the use of a trusted transaction to perform the transfer. If there is sufficient trust between XYZ and the selected treasury bank, the parties can choose to do a traditional two party trade in which the treasury bank would receive coins and XYZ would receive the USD from the treasury bank. If one of the parties does not fulfill its obligation, all transactions may be recorded in the smart contract ledger as well as the distributed ledger so that outside parties may verify which party was acting maliciously. In this way, blockchain transparency may provide an incentive for participating institutions to not cheat on their funds transfers.

Implementations also support the use of an untrusted transaction to perform the transfer. If there is not sufficient trust between XYZ and a treasury bank, the parties may utilize the smart contract to arbitrate the transaction. For example, XYZ, the treasury bank (TB), the smart contract (SC), and a trusted third party (TTP) may be part of this trust-less transaction. XYZ may send 20,000 coins in a transaction to the SC with instructions that XYZ wishes to enter a trust-less transaction with TB. TB may be notified of the intent to transact and may send a message that provides the public address of a TTP that both TB and XYZ both agree is fair.

In some implementations, the coins may be held in escrow in the SC until the transaction is verified by at least some of the other parties (e.g., two out of the TB, SC, and TTP) that the transaction has completed successfully. TB may send $20,000 (e.g., in an ACH or wire transfer) to XYZ and TB may provide proof of the transaction to the TTP and/or XYZ through the SC. If XYZ is satisfied with the proof of transaction that TB presented, XYZ may sign a transaction that is sent to the SC to authorize the release of the coins to TTP. If XYZ is not satisfied that the proof of transaction is legitimate, or if XYZ fails to receive funds in a timely manner, XYZ can raise a dispute. TB may also raise a dispute at any time if XYZ receives the USD transfer, but fails to release the coins from escrow. If there is a dispute raised, the TTP may make a decision as to which entity is entitled to the coins in escrow, and TTP may sign a transaction to release the coins to the entitled party.

In some instances, the smart contracts may be "smart enough," and may be integrated into enough systems, so that a TTP may not be needed. Rather than a physical TTP participating, the smart contract can use existing metadata, such as image recognition of the transfer proof and transaction records from the ACH network, to act as the trusted third party and make accurate determinations of which entity is trying to commit fraud, if fraud is attempted.

If a treasury bank is holding assets that were used as the basis for minting coins (e.g., through an association between coins and assets that is agreed upon by the consortium), and the treasury bank transacts in coins-to-USD trade, the coins may not be delivered to the treasury bank and may instead be destroyed by the smart contract. The reason for this is that the USD that were used in the process of minting the coins is to be destroyed once the actual USD that pegs the coins' value is no longer being held for the purpose of providing value for the coins. Although examples herein may use USD as an example of (e.g., non-digital) currency, implementations are not limited to using USD. Any suitable fiat currency and/or digital (crypto) currency may be employed by implementations.

In some implementations, the smart contracts may act as a system of decentralized automatons that carry out operations of the interchange system, including asset creation, asset transfer, asset verification, and/or network access permission determination. The smart contracts ensure that such operations may not be influenced by attackers who wish to maliciously hijack the code to commit fraud, because every transaction and every logical step that occurs on the network via smart contracts may be executed and validated by a suitable number of peers (or all peers) in the network.

The interchange network and smart contract system described herein provide an improved way to transact between institutions quickly, cheaply, and with much less fraud compared to traditional systems. Implementations are able to settle transactions in real time and to automatically reconcile their ledger based on various transactions. Settlement describes the actual transfer of the value of funds between institutions to complete the payment instruction specified in the transaction. In some implementations, at least two types of financial instruments are supported by the interchange system, e.g., coins and USD. Other types of instruments may also be employed. If both entities making the transaction on the interchange network transact using coins, the settlement may be nearly instant. In such instances, the entities may keep the coins and not exchange them for USD, which would provide a nearly free transaction.

Some entities involved in the trade may want to "cash out" their coins for USD every time a transaction occurs or after a certain threshold amount or volume of transactions occurs. In some implementations, there may be a disincentive to cashing out coins to USD frequently. The fees associated with transacting from coins to USD may be set high and the transaction may take much longer than if an entity retained its coins and continued transacting with them. Large institutional settlements between major financial institutions could still occur using ACH and/or wire transfer systems. However, given a high enough rate of participation in the interchange system, transacting purely in coins may save large institutions more money than switching back to USD. When coins are transferred to USD, the transaction time may be governed by the methods used to transact in USD outside of the interchange network.

Reconciliation of funds may be performed through the smart contract itself. The smart contract may keep track of the coins that are created, transacted with, and/or destroyed. Additionally, the smart contract may keep track of the total number of coins allocated for each institution (e.g., at the institution's address in the system). The transparency of blockchain networks allow for authorized parties, and/or all parties in the network if needed, to view the coin totals of any all participants in the network. The types of data that are publicly visible, and/or the amount of data that is only visible to parties involved in a particular trade, may be specified by the participants at the creation of the distributed ledger system. The restrictions can be altered later if a rule change transaction is sent to the smart contract from authorized parties or groups of parties to change the protocol. However, such changes may be limited to certain features of the distributed ledger system.

Reconciliation for a coins-to-coins transfer may be instant (or close to instant) and may be automatically performed using the smart contract. Coins-to-USD transfers may also be recorded through the smart contract, and may be limited in speed based on the mechanisms that transfer USD outside of the interchange network.

Implementations may also support future advancements in distributed ledger (e.g., blockchain) technology. The coin management smart contract(s) may be a (e.g., primary) component of the distributed ledger based interchange system, and implementations may also include a larger infrastructure of smart contracts that perform specific tasks needed for the interchange network to function. For example: the network can include a coin smart contract version 1 (v1), a coins-to-USD smart contract v1, and a coins-to-coins smart contract v1. The coin smart contract may act as a sorting facility to send the transactions to the appropriate other smart contracts depending on whether the parties transact using coins, or using coins to USD. In some implementations, the ACH system or other channel may be integrated into a blockchain that can be read by other smart contracts. Implementations may be modified to include a coins-to-USD smart contract v2, and an update may be made to the coins smart contract sorting directory to indicate that coins-to-USD transactions are to use coins-to-USD smart contract v2 instead of v1. The coins-to-USD smart contract v1 may be instructed to become inoperable (e.g., uncallable). The state of the v1 coins-to-USD contract and its history of transactions may still be on the distributed ledger, but transactions may no longer be handled by v1. The coins-to-USD contract v2 may perform the tasks that were previously handled by v1, but with added features for ACH support, for example.

Implementations support the use of any suitable distributed ledger (e.g., blockchain) and/or smart contract platform, including but not limited to the platforms provided by Counterparty, Ethereum, and the Eris Industries software stack. In some implementations, the smart contract(s) may be built at least partly using Ethereum's high level languages, and may be run on any of the software platforms listed above, or others. The Eris Industries platform uses a Tendermint proof-of-stake blockchain and Counterparty uses their own blockchain that is powered by proof-of-burn XCP currency. Implementations may employ distributed ledger(s) that support proof-of-work, proof-of-stake, proof-of-burn, and/or other methodologies.

Blockchain systems are created in part to promote fairness, transparency, and ease of auditing to prevent fraud from bad actors. Implementations may provide these aspects while maintaining the financial and personal security of the participating institutions and their customers. Accordingly, in some implementations transaction schemes and security protocols may be employed. This may include a public key infrastructure (PKI) in the transactions to ensure that only the sender and recipient are aware of the particular details (e.g., parties) of the transaction. The other participants in the network may have visibility into the total coin supply of each institution participating, to maintain the level of transparency and/or fraud prevention that distributed ledgers (e.g., blockchains) offer.

Alternatively, implementations may employ encryption or other forms of security to ensure that participants may not have visibility into other participants' assets in the interchange network. An encryption scheme may be employed for transactions to prevent other participating institutions from knowing how much a particular institution may have in their treasury account, which an institution may wish to keep private from their competitors or others. In some implementations, homomorphic encryption may be employed so that transactions may be encrypted but may still be processed correctly by the smart contracts or other processes. Homomorphic encryption may enable the processing units to correctly process the transactions, while preventing any other on-looking processes from viewing the details of the transaction, such as the amount involved, the parties to the transaction, and so forth. Implementations may use a partially homomorphic encryption system, which may allow basic debit and/or credit adjustments, and/or a fully homomorphic encryption system, which may allow for arbitrary computation. Implementations also support the use of any other suitable type of encryption and/or encryption algorithm. Implementations may also employ other security techniques in addition to or instead of encryption. In some implementations, tokenization of data may be employed. The tokenization of data, which may be manually reviewed by a third-party arbiter or auditor, allows proprietary information to never leave the secure systems of one of the members, but may still be provably tied to the blockchain using a hash of the data, for example.

Implementations may support various money transfer formats and standards, such as those promulgated by SWIFT, STP 820, FedWire, and IBAN. In some implementations, multiple smart contracts within the system may facilitate the use of different message types. For example, the smart contracts may include a bank-to-bank smart contract, a bank-to-business smart contract, a person-to-person smart contract, and a person-to-bank smart contract, each with different formats and each complying to a different set of regulatory rules. One or more smart contracts may also be configured to send transactions that are compliant with external systems such as ACH.

Figure 5A:
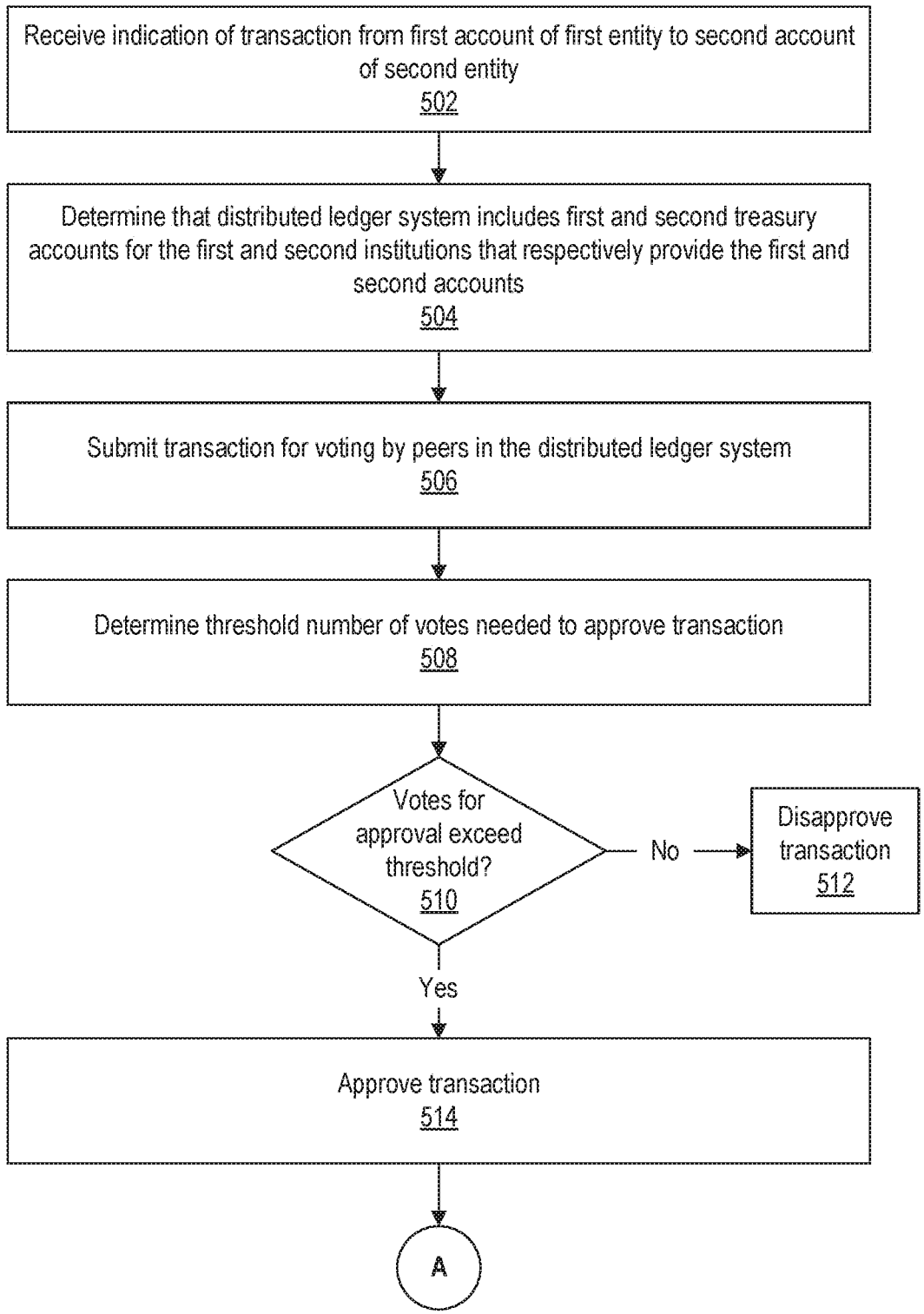
FIGS. 5A, 5B, and 5C depict flow diagrams of example processes for a distributed ledger based interchange, according to implementations of the present disclosure.
Figure 5B:
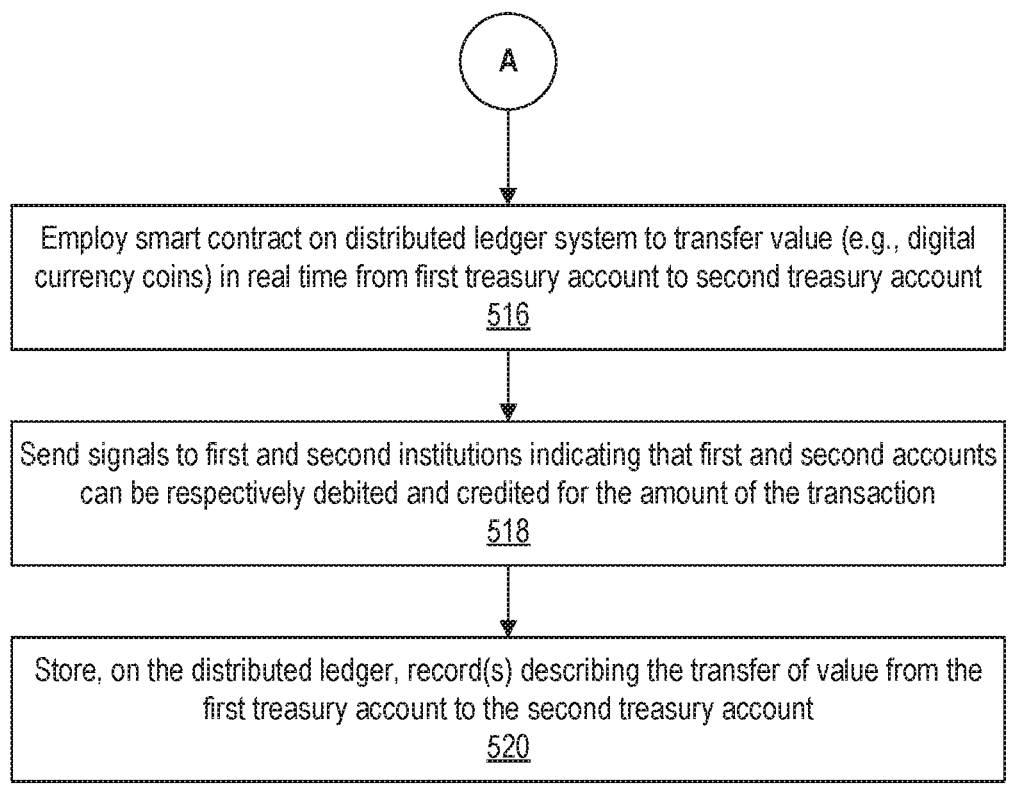
Figure 5C:
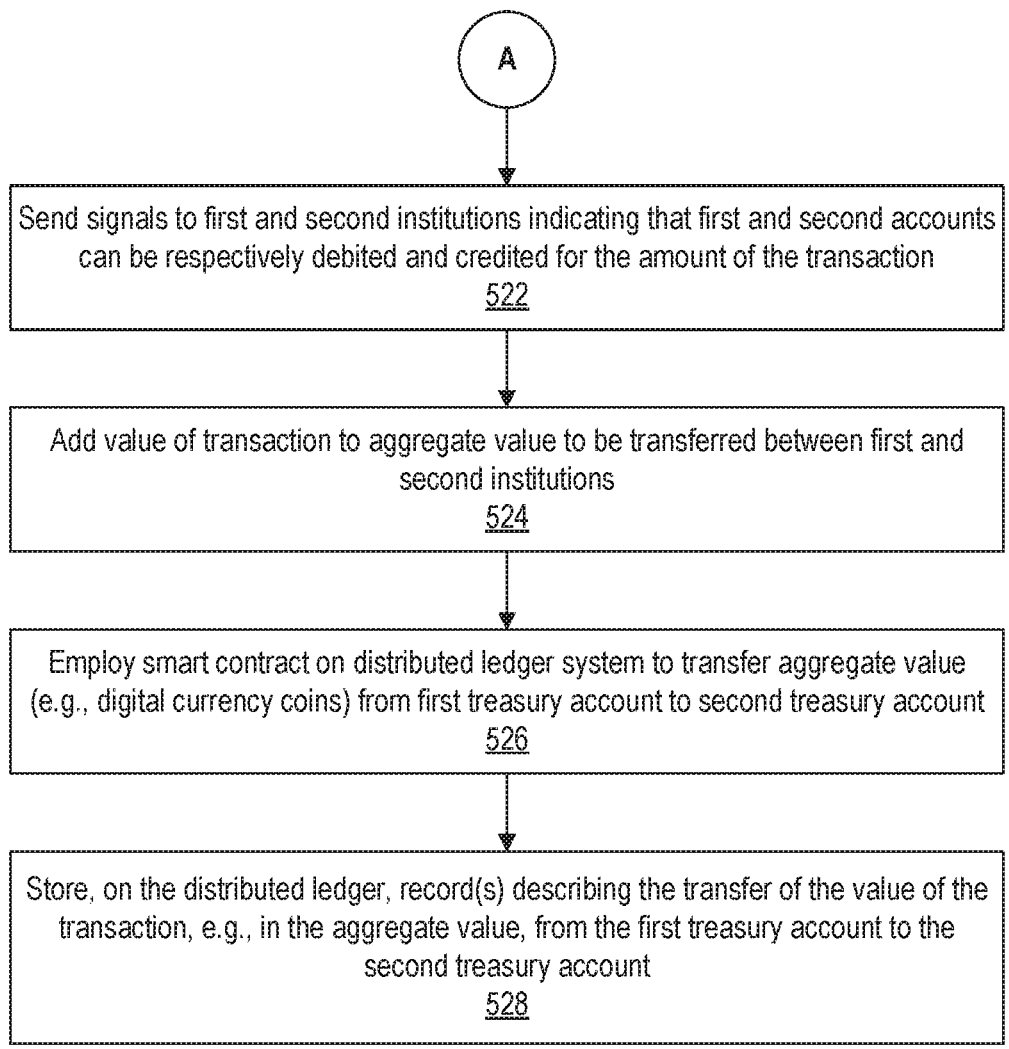

FIGS. 5A, 5B, and 5C depict flow diagrams of example processes for a distributed ledger based interchange, according to implementations of the present disclosure. Operations of the processes may be performed by one or more of the smart contract(s) 412 and/or other software module(s) executing on the distributed ledger system 410, the institutional system(s) 404, or elsewhere.

An indication may be received (502) of a transaction involving a first entity 402(1) and a second entity 402(2) as described above. The entities 402 may be individuals, business entities, organizations, government agencies, and so forth. As described with reference to FIG. 4, the first entity may have an account with a first financial institution (e.g., bank, credit union, etc.), and the second entity may have an account with a second financial institution. The first and second institutions may be the same institution or different institutions. The transaction may include any type of transaction in which some form of value, currency or otherwise, is to be transferred from the first entity to the second entity. For example, a transaction may be initiated when a customer swiped their payment card to make a purchase from a merchant.

A determination may be made (504) that the first and second institutions are participants in the distributed ledger based interchange system. As described above, participants in the system may each have a treasury account 414 on the distributed ledger system 410. If both institutions are participants, they may elect to perform the transaction through the distributed ledger based interchange system instead of using some other channel such as FedWire, ACH, a credit card network, and so forth.

In some implementations, the proposed transaction may be submitted (506) for voting among the peers in the distributed ledger system 410. In some instances, the peers include the various institutions that participate in the system and that have treasury accounts 414 on the distributed ledger system 410. Peers may also include non-participating entities that operate to audit the system, adding further safeguard against fraud. Although such a peer may have no actual treasury account balance and therefore no stake in the system, in order to vote the peer may be required to prove its interest in the system according to the protocol. In a proof-of-work system, to be a voting member the peer may also be required to provide computation power. In a proof-of-stake system, the peer may be required to have some type of assets invested in the system.

In some implementations, a threshold number of votes may be determined (508) that is needed to approve the transaction. The threshold may be set low enough to ensure that transactions are processed rapidly while still high enough to prevent fraudulent transactions. For example, a threshold of three approval votes (e.g., out of 10 peers) may be needed to approve the transaction. In some implementations, the approval of all the peers may be needed to approve the transaction. In some implementations, the threshold may be adjusted based on a determined trust level for one or both of the institutions involved in the transaction. For example, if two trusted, well-known, and/or reputable banks are transacting in the interchange system, the threshold may be set lower than it would be if at least one of the parties is a new participant in the interchange network, or otherwise has not yet developed a reputation.

A determination may be made (510) whether the number of approval votes exceed the threshold. If not, the transaction may be disapproved (512), e.g., denied, blocked, or otherwise disallowed. In such instances, the institutions and/or entities may be informed that the transaction has been denied. If the number of approval votes meets or exceeds the threshold, the transaction may be approved (514). In some implementations, not all votes may be collected before deciding whether to proceed or not proceed with the transaction. For example, if approval requires the "yes" votes of five out of ten peers, the transaction processing may proceed as soon as five "yes" votes are received from five peers, without waiting for the other five votes. If approval requires the unanimous "yes" votes of all ten peers, the transaction may be denied after receiving the first "no" vote, and no further processing may be performed. The process may continue as described with reference to FIG. 5B or FIG. 5C, depending on whether settlement is to be performed in real time or in an aggregate settlement.

FIG. 5B depicts implementations in which settlement is performed in real time as described above. In some implementations, a smart contract 412 on the distributed ledger system 410 may be employed (516) to transfer value in real time from the treasury account of the sending institution to the treasury account of the receiving institution, as described above. In some implementations, the transferred value may be in the form of a number of digital currency coins, such that that total value of the transferred coins corresponds to the monetary value of the transaction.

Signals (e.g., messages) may be sent (518) to the institutions indicating that the transaction has been approved and that the accounts 406 may be respectively debited and credited with the appropriate amount of the transaction.

In some implementations, the smart contract may store (520) on the distributed ledger one or more records describing the transaction, to provide audit information regarding the transaction.

FIG. 5C depicts implementations in which settlement is performed as an aggregate (e.g., batch) settlement process that is not necessarily in real time with respect to the transaction. Signals (e.g., messages) may be sent (522) to the institutions indicating that the transaction has been approved and that the accounts 406 may be respectively debited and credited with the appropriate amount of the transaction.

The value of the transaction may be added (524) to an aggregate value that may be accumulated over the course of a time period (e.g., a day). The aggregate value may be the total of the transactions that have been performed between the two institutions through the course of the time period. For example, Transaction A may be a transfer of $143 from Bank X to Bank Y, and Transaction B may be a transfer of $17 from Bank Y to Bank X, and the aggregate value may be $126 from Bank X to Bank Y.

In some implementations, a smart contract 412 on the distributed ledger system 410 may be employed (526) to transfer the aggregate value between the treasury accounts of the institutions. In some implementations, the transferred aggregate value may be in the form of a number of digital currency coins, such that that total value of the transferred coins corresponds to the monetary equivalent of the aggregate value. Implementations support the use of any frequency for aggregate (e.g., batch) settlement. In some implementations, settlement may be performed nightly between each pair of institutions participating in the interchange system, if any transactions have occurred between the institutions since the last aggregate settlement.

In some implementations, the smart contract may store (528) on the distributed ledger one or more records describing the transaction and/or aggregate settlement, to provide audit information regarding the transaction. In some implementations, ACH or some other channel may be employed to perform the aggregate settlement transfers, and settlement may be performed in the aggregate to minimize transfer fees and processing overhead.

Figure 6:
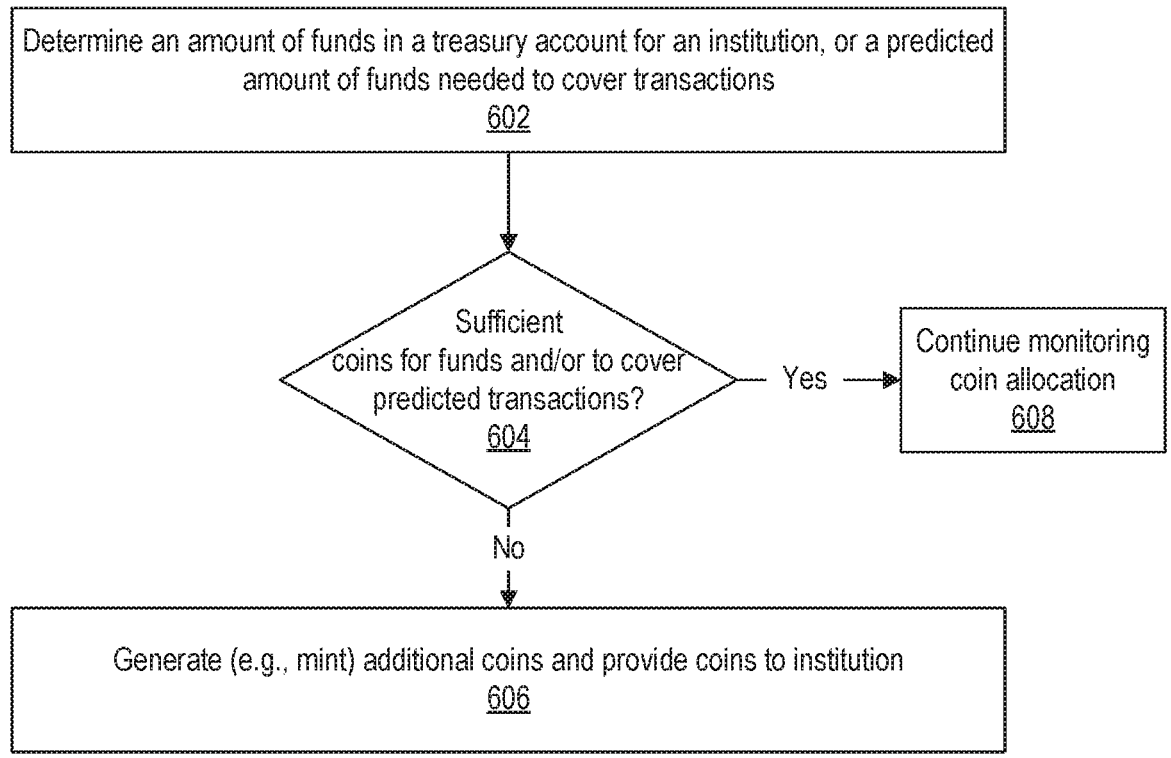
FIG. 6 depicts a flow diagram of an example process for providing digital currency coins for entities participating in a distributed ledger based interchange, according to implementations of the present disclosure.

FIG. 6 depicts a flow diagram of an example process for providing digital currency coins for entities participating in a distributed ledger based interchange, according to implementations of the present disclosure. Operations of the process may be performed by one or more of the smart contract(s) 412 and/or other software module(s) executing on the distributed ledger system 410, the institutional system(s) 404, or elsewhere.

A determination may be made (602) of an amount of funds that have been deposited to a treasury account 414 by a corresponding institution that is a participant in the distributed ledger based interchange system. In some implementations, a determination may be made of an amount of fund that would be need to cover the predicted total transactions involving the institution over an upcoming period of time.

If (604) there are sufficient coins already allocated to the institution to cover their deposited funds and/or expected transactions, the process may continue monitoring coin allocation for the institution (608). If (604) there are insufficient coins, additional coins may be generated (606), e.g., minted, and allocated to the institution as described above. In some implementations, the distributed ledger system 410 may include a process (e.g., an "oracle") that monitors the amount of funds an institution has placed in their treasury account and ensure that there are sufficient coins to cover transactions. More coins may be minted as needed to cover transactions.

As described above, settlement between institutions may be through the transfer of coins between institutions. Such use of coins provides for a fast, low cost settlement between institutions. Use of coins is also convenient for internationalization support, given that frequent conversions among a large number of different national currencies may be avoided.

In some implementations, the value of reserve funds in the system may change as institutions join or leave the system. As described above, the value of coins may be fixed, e.g., pegged to a national currency. For example, a coin may be pegged to a value of one USD. In some implementations, the coins may be employed to facilitate the movement of value between the participating institutions, not as a replacement for any national currency.

Because implementations employ a decentralized, distributed ledger network as the basis of an interchange system, implementations avoid the use of a single, centralized bank for settlement between institutions, such as in the FedWire network that uses the U.S. Federal Reserve System. Accordingly, implementations simplify the settlement process while providing for real time, secure settlement. In some implementations, each participating institution may have its own instance of the blockchain network, and each participating instance may operate as a processing node and/or peer on the blockchain network. Alternatively, each institution may have its own blockchain network that is related as a sidechain to other blockchain network(s) of other institution(s). In such instances, the institution-specific processing may be performed on the institution's own blockchain, and coins or other types of tokens may be transferred between different institutional blockchains during settlement.

As described above, implementations provide reliable traceability and auditing for any funds that are transferred using the distributed ledger based interchange system, through the transparency and immutability of the distributed ledger. Transactions can be readily reversed using the audit information stored in the distributed ledger. Such reversal may be performed reliably regardless of the complexity of the transaction, e.g., regardless of the number of legs and/or sub-transactions involved in an overall transaction. Reversal may be performed in real time in response to detection of possible fraud, or in response to a reversal request from the institutions and/or entities involved in the transaction. Reversing a transaction may include performing one or more new transactions that are effectively the opposite or inverse of the original transaction(s), and the audit records stored in the distributed ledger may indicate that both the original transaction and the reversal transaction have been performed. Removing any trace of the original transaction on the blockchain may not be possible given the immutable nature of blockchain data storage.

FIG. 8 depicts an example computing system, according to implementations of the present disclosure. The system 800 may be used for any of the operations described with respect to the various implementations discussed herein. For example, the system 800 may be included, at least in part, in one or more of the distributed ledger system 410, the institutional system(s) 404(1) and/or 404(2), the token device 104, the portable computing device 106, the server device(s) 108, the node(s) 112, and/or other computing device(s) or system(s) described herein. The system 800 may include one or more processors 810, a memory 820, one or more storage devices 830, and one or more input/output (I/O) devices 850 controllable through one or more I/O interfaces 840. The various components 810, 820, 830, 840, or 850 may be interconnected through at least one system bus 860, which may enable the transfer of data between the various modules and components of the system 800.

The processor(s) 810 may be configured to process instructions for execution within the system 800. The processor(s) 810 may include single-threaded processor(s), multi-threaded processor(s), or both. The processor(s) 810 may be configured to process instructions stored in the memory 820 or on the storage device(s) 830. The processor(s) 810 may include hardware-based processor(s) each including one or more cores. The processor(s) 810 may include general purpose processor(s), special purpose processor(s), or both.

The memory 820 may store information within the system 800. In some implementations, the memory 820 includes one or more computer-readable media. The memory 820 may include any number of volatile memory units, any number of non-volatile memory units, or both volatile and non-volatile memory units. The memory 820 may include read-only memory, random access memory, or both. In some examples, the memory 820 may be employed as active or physical memory by one or more executing software modules.

The storage device(s) 830 may be configured to provide (e.g., persistent) mass storage for the system 800. In some implementations, the storage device(s) 830 may include one or more computer-readable media. For example, the storage device(s) 830 may include a floppy disk device, a hard disk device, an optical disk device, or a tape device. The storage device(s) 830 may include read-only memory, random access memory, or both. The storage device(s) 830 may include one or more of an internal hard drive, an external hard drive, or a removable drive.

One or both of the memory 820 or the storage device(s) 830 may include one or more computer-readable storage media (CRSM). The CRSM may include one or more of an electronic storage medium, a magnetic storage medium, an optical storage medium, a magneto-optical storage medium, a quantum storage medium, a mechanical computer storage medium, and so forth. The CRSM may provide storage of computer-readable instructions describing data structures, processes, applications, programs, other modules, or other data for the operation of the system 800. In some implementations, the CRSM may include a data store that provides storage of computer-readable instructions or other information in a non-transitory format. The CRSM may be incorporated into the system 800 or may be external with respect to the system 800. The CRSM may include read-only memory, random access memory, or both. One or more CRSM suitable for tangibly embodying computer program instructions and data may include any type of non-volatile memory, including but not limited to: semiconductor memory devices, such as EPROM, EEPROM, and flash memory devices; magnetic disks such as internal hard disks and removable disks; magneto-optical disks; and CD-ROM and DVD-ROM disks. In some examples, the processor(s) 810 and the memory 820 may be supplemented by, or incorporated into, one or more application-specific integrated circuits (ASICs).

The system 800 may include one or more I/O devices 850. The I/O device(s) 850 may include one or more input devices such as a keyboard, a mouse, a pen, a game controller, a touch input device, an audio input device (e.g., a microphone), a gestural input device, a haptic input device, an image or video capture device (e.g., a camera), or other devices. In some examples, the I/O device(s) 850 may also include one or more output devices such as a display, LED(s), an audio output device (e.g., a speaker), a printer, a haptic output device, and so forth. The I/O device(s) 850 may be physically incorporated in one or more computing devices of the system 800, or may be external with respect to one or more computing devices of the system 800.

The system 800 may include one or more I/O interfaces 840 to enable components or modules of the system 800 to control, interface with, or otherwise communicate with the I/O device(s) 850. The I/O interface(s) 840 may enable information to be transferred in or out of the system 800, or between components of the system 800, through serial communication, parallel communication, or other types of communication. For example, the I/O interface(s) 840 may comply with a version of the RS-232 standard for serial ports, or with a version of the IEEE 1284 standard for parallel ports. As another example, the I/O interface(s) 840 may be configured to provide a connection over Universal Serial Bus (USB) or Ethernet. In some examples, the I/O interface(s) 840 may be configured to provide a serial connection that is compliant with a version of the IEEE 1394 standard.

The I/O interface(s) 840 may also include one or more network interfaces that enable communications between computing devices in the system 800, or between the system 800 and other network-connected computing systems. The network interface(s) may include one or more network interface controllers (NICs) or other types of transceiver devices configured to send and receive communications over one or more networks using any network protocol.

Computing devices of the system 800 may communicate with one another, or with other computing devices, using one or more networks. Such networks may include public networks such as the internet, private networks such as an institutional or personal intranet, or any combination of private and public networks. The networks may include any type of wired or wireless network, including but not limited to local area networks (LANs), wide area networks (WANs), wireless WANs (WWANs), wireless LANs (WLANs), mobile communications networks (e.g., 3G, 4G, Edge, etc.), and so forth. In some implementations, the communications between computing devices may be encrypted or otherwise secured. For example, communications may employ one or more public or private cryptographic keys, ciphers, digital certificates, or other credentials supported by a security protocol, such as any version of the Secure Sockets Layer (SSL) or the Transport Layer Security (TLS) protocol.

The system 800 may include any number of computing devices of any type. The computing device(s) may include, but are not limited to: a personal computer, a smartphone, a tablet computer, a wearable computer, an implanted computer, a mobile gaming device, an electronic book reader, an automotive computer, a desktop computer, a laptop computer, a notebook computer, a game console, a home entertainment device, a network computer, a server computer, a mainframe computer, a distributed computing device (e.g., a cloud computing device), a microcomputer, a system on a chip (SoC), a system in a package (SiP), and so forth. Although examples herein may describe computing device(s) as physical device(s), implementations are not so limited. In some examples, a computing device may include one or more of a virtual computing environment, a hypervisor, an emulation, or a virtual machine executing on one or more physical computing devices. In some examples, two or more computing devices may include a cluster, cloud, farm, or other grouping of multiple devices that coordinate operations to provide load balancing, failover support, parallel processing capabilities, shared storage resources, shared networking capabilities, or other aspects.

Implementations and all of the functional operations described in this specification may be realized in digital electronic circuitry, or in computer software, firmware, or hardware, including the structures disclosed in this specification and their structural equivalents, or in combinations of one or more of them. Implementations may be realized as one or more computer program products, i.e., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "computing system" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any appropriate form of programming language, including compiled or interpreted languages, and it may be deployed in any appropriate form, including as a standalone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any appropriate kind of digital computer. Generally, a processor may receive instructions and data from a read only memory or a random access memory or both. Elements of a computer can include a processor for performing instructions and one or more memory devices for storing instructions and data. Generally, a computer may also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, implementations may be realized on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any appropriate form of sensory feedback, e.g., visual feedback, auditory feedback, or tactile feedback; and input from the user may be received in any appropriate form, including acoustic, speech, or tactile input.

Implementations may be realized in a computing system that includes a back end component, e.g., as a data server, or that includes a middleware component, e.g., an application server, or that includes a front end component, e.g., a client computer having a graphical UI or a web browser through which a user may interact with an implementation, or any appropriate combination of one or more such back end, middleware, or front end components. The components of the system may be interconnected by any appropriate form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other. The computing system may also include any number of peers which may be distributed and/or remote from one another. The peers may enter into peer-to-peer relationships and establish peer-to-peer connections for communications.

While this specification contains many specifics, these should not be construed as limitations on the scope of the disclosure or of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable subcombination. Moreover, although features may be described above as acting in certain combinations and even initially claimed as such, one or more features from a claimed combination may in some examples be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

What is claimed is:

1. A server device, comprising:
   a processor; and
   a memory communicatively coupled to the processor, the memory storing instructions which, when executed, cause the processor to perform operations comprising:
   receiving a request to perform a transaction from a point-of-sale terminal via a distributed ledger comprising a smart contract, wherein the request comprises an amount associated with the transaction;
   receiving authentication data for authenticating the request from a token device comprising a biometric sensor and a wireless transceiver, wherein the authentication data corresponds to an identity of a user associated with the transaction and is acquired by the biometric sensor of the token device;
   sending a plurality of requests for a plurality of votes to a plurality of peer devices to verify that the transaction can be executed based on an account associated with the user and the amount in response to authenticating the user based on the authentication data, wherein each of the plurality of peer devices is associated with a treasury account represented on the distributed ledger;

receiving a number of votes from the plurality of peer devices to approve the transaction; and sending an additional request to the smart contract to execute the transaction in response to the number of votes exceeding a threshold number of votes, wherein the smart contract is configured to:

execute the transaction via the distributed ledger; and
store a record of the transaction on the distributed ledger.

2. The server device of claim 1, wherein the authentication data comprises biometric data associated with the user.

3. The server device of claim 1, wherein the threshold number of votes is at least half of a total number of the plurality of peer devices.

4. The server device of claim 1, wherein each of the plurality of peer devices represents a separate entity that is not receiving funds that correspond to the amount or dispersing the funds in the transaction.

5. The server device of claim 1, wherein the instructions are configured cause the processor to execute the transaction by transferring digital currency to an account associated with the point-of-sale terminal.

6. A non-transitory computer-readable media storing instructions which, when executed, cause a processor to perform operations comprising:

receiving a request to perform a transaction from a point-of-sale terminal via a distributed ledger comprising a smart contract, wherein the request comprises an amount associated with the transaction;

receiving authentication data for authenticating the request from a token device comprising a biometric sensor and a wireless transceiver, wherein the authentication data corresponds to an identity of a user associated with the transaction and is acquired by the biometric sensor;

sending a plurality of requests for a plurality of votes to a plurality of peer devices to verify that the transaction can be executed based on an account associated with the user and the amount in response to authenticating the user based on the authentication data, wherein each of the plurality of peer devices is associated with a treasury account represented on the distributed ledger;

receiving a number of votes from the plurality of peer devices to approve the transaction; and sending an additional request to the smart contract to execute the transaction in response to the number of votes exceeding a threshold number of votes, wherein the smart contract is configured to:

execute the transaction via the distributed ledger; and
store a record of the transaction on the distributed ledger.

7. The non-transitory computer-readable media of claim 6, wherein the instructions cause the processor to authenticate the request based on a comparison of the authentication data with stored authentication data associated with the user.

8. The non-transitory computer-readable media of claim 6, wherein the authentication data comprises biometric data.

9. The non-transitory computer-readable media of claim 8, wherein the biometric data comprise a scan of a fingerprint of the user.

10. The non-transitory computer-readable media of claim 6, wherein the instructions that cause the processor to execute the transaction comprises sending an additional request to the smart contract, wherein the smart contract is configured to transfer funds that corresponds to the amount from the treasury account.

11. The non-transitory computer-readable media of claim 10, wherein the number of votes is received via the smart contract.

12. The non-transitory computer-readable media of claim 10, wherein the smart contract is configured to transfer the funds via a wire transfer, an automatic clearing house (ACH) transaction, or any combination thereof.

13. The non-transitory computer-readable media of claim 6, wherein the distributed ledger comprises a blockchain.

14. The non-transitory computer-readable media of claim 6, wherein the number of votes corresponds to less than a total number of outstanding votes.

15. A method, comprising:

receiving, via a processor, a request to perform a transaction from a point-of-sale terminal, via a distributed ledger comprising a smart contract, wherein the request comprises an amount associated with the transaction;

receiving, via the processor, authentication data for authenticating the request from a token device comprising a biometric sensor and a wireless transceiver, wherein the authentication data corresponds to an identity of a user associated with the transaction and is acquired by a biometric sensor of the token device;

sending a plurality of requests for a plurality of votes to a plurality of peer devices to verify that the transaction can be executed based on an account associated with the user and the amount in response to authenticating the user based on the authentication data, wherein each of the plurality of peer devices is associated with a treasury account represented on the distributed ledger;

receiving, via the processor, a number of votes from the plurality of peer devices to approve the transaction; and sending, via the processor, an additional request to the smart contract to execute the transaction in response to the number of votes exceeding a threshold number of votes, wherein the smart contract is configured to:

execute the transaction via the distributed ledger; and
store a record of the transaction on the distributed ledger.

16. The method of claim 15, comprising:

approving the transaction based at least partly on the plurality of the votes to approve exceeding a threshold number and, in response, transferring value from a first treasury account to a second treasury account on the distributed ledger, wherein the value corresponds to the amount; and storing at least one record that describes the transferring of the value from the first treasury account to the second treasury account on the distributed ledger.

17. The method of claim 16, wherein the value transferred from the first treasury account to the second treasury account is a number of coins in a digital currency, the number of coins corresponding to the amount.

18. The server device of claim 1, wherein the instructions cause the processor to perform operations comprising receiving the request to perform the transaction from the point-of-sale terminal in response to the token device being within a proximity of the point-of-sale terminal.

19. The server device of claim 1, wherein the instructions cause the processor to perform operations comprising sending the additional request to the smart contract to execute the transaction in real time.

* * * * *